(12) United States Patent
Caminade et al.

(10) Patent No.: US 8,039,580 B2
(45) Date of Patent: Oct. 18, 2011

(54) DENDRITIC POLYMERS HAVING MONOPHOSPHONIC TERMINATIONS, METHOD FOR PREPARING THEM, AND THEIR USE

(75) Inventors: Anne-Marie Caminade, Toulouse (FR); Jean-Pierre Majoral, Ramonville St Agne (FR); Laurent Griffe, Carcassonne (FR); Cédric Turrin, Toulouse (FR); Pascal Metivier, Paris (FR)

(73) Assignees: Rhodia UK Ltd., Watford (GB); Centre National de la Recherche Scientifique (C.N.R.S.), Paris (FR)

( * ) Notice: Subject to any disclaimer, the term of this patent is extended or adjusted under 35 U.S.C. 154(b) by 560 days.

(21) Appl. No.: 10/580,422

(22) PCT Filed: Nov. 23, 2004

(86) PCT No.: PCT/FR2004/002989
§ 371 (c)(1), (2), (4) Date: May 24, 2006

(87) PCT Pub. No.: WO2005/052032
PCT Pub. Date: Jun. 9, 2005

(65) Prior Publication Data
US 2007/0083034 A1    Apr. 12, 2007

(30) Foreign Application Priority Data
Nov. 24, 2003 (FR) .................................. 03 13751

(51) Int. Cl.
*C08G 79/04* (2006.01)
*C08G 79/06* (2006.01)
(52) U.S. Cl. .................. 528/398; 528/399; 424/DIG. 16

(58) Field of Classification Search ........... 424/DIG. 16; 504/367
See application file for complete search history.

(56) References Cited

U.S. PATENT DOCUMENTS

| 4,783,500 | A | 11/1988 | Webster |
| 4,871,779 | A | 10/1989 | Killat et al. |
| 6,464,971 | B1 * | 10/2002 | Matthews et al. ...... 424/DIG. 16 |
| 6,939,831 | B1 * | 9/2005 | Caminade et al. ............ 504/367 |

FOREIGN PATENT DOCUMENTS

| DE | 144 264 A | 10/1980 |
| FR | 2734268 | 5/1995 |
| KR | 96 002224 B | 2/1996 |
| WO | 00/64975 A1 | 11/2000 |

OTHER PUBLICATIONS

Delphine Prevote, Anne-Marie Caminade, and Jean Pierre Majoral. Phosphate-, Phosphite-, Ylide-, and Phosphonate-Terminated Dendrimers. Jan. 30, 1997. J. Org. Chem. 1997, 62, 4834-4841.*
Abstract of JP 05 178710 A of Jul. 20, 1993, Patent Abstracts of Japan, Oct. 28, 1993, vol. 0175, No. 91 (C-1125).
Launay et al., "Synthesis of bowl-shaped dendrimers from generation 1 to generation 8," *J. Organometallic Chemistry*, 1997, pp. 51-58. vol. 529, Elsevier Science S.A.
Prévôté, et al., "Phosphate-, Phosphite-, Ylide-, and Phosphonate-Terminated Dendrimers," *J. Org. Chem.* 1997, vol. 62, pp. 4834-4841, American Chemical Society, US.
Launay et al., A General Synthetic Strategy for Neutral Phosphorus-Containing Dendrimers, Angew. Chem. Int. Ed. Engl., 1994, vol. 33, pp. 1589-1592. VCH Verlogsgesellschaft mbH, Germany.

* cited by examiner

*Primary Examiner* — Randy Gulakowski
*Assistant Examiner* — Mike Dollinger
(74) *Attorney, Agent, or Firm* — Buchanan Ingersoll & Rooney, P.C.

(57) ABSTRACT

The invention relates to novel dendritic polymers having monophosphonic terminations or dimethyl phosphonates, to a method for preparing them, and to their uses.

57 Claims, No Drawings

DENDRITIC POLYMERS HAVING MONOPHOSPHONIC TERMINATIONS, METHOD FOR PREPARING THEM, AND THEIR USE

CROSS-REFERENCE TO PRIORITY/PCT APPLICATIONS

This application claims priority under 35 U.S.C. 119 of FR 03/13751, filed Nov. 24, 2003, and is the national phase of PCT/FR2004/002989, filed Nov. 23, 2004 and designating the United States, published on Jun. 9, 2005 as WO 2005/052032 A1, each hereby expressly incorporated by reference.

Dendritic polymers are macromolecules composed of monomers which combine according to a branching process around a central multifunctional core.

Dendritic polymers, also called "cascade molecules", are highly branched functional polymers of defined structure. Those macromolecules are, in fact, polymers because they are based on the combination of repeating units. However, dendritic polymers are fundamentally different from conventional polymers in that they have their own properties due to their branched structure. The molecular weight and the form of dendritic polymers can be controlled precisely, and all the functions are situated at the termination of the branches, forming a surface, which renders them readily accessible.

Dendritic polymers are constructed step by step by the repetition of a reaction sequence, allowing each repeating unit and the terminal functions to be multiplied.

Each reaction sequence forms a so-called "new generation". The branched structure is obtained by the repetition of a reaction sequence, which allows a new generation and an increasing number of identical branches to be obtained at the end of each reaction cycle. After several generations, the dendritic polymer generally assumes a globular form which is highly branched and multifunctionalised by virtue of the large number of terminal functions present at the periphery.

Such polymers have been described especially by Launay et al., *Angew. Chem. Int. Ed. Engl.*, 1994, 33, 15/16, 1589-1592, or by Launay et al., *Journal of Organometallic Chemistry*, 1997, 529, 51-58.

The treatment of surfaces, for example in order to protect them, involves the phenomenon of adhesion, which often requires the presence of hydrogen-bond donor and acceptor groups on the surface and/or the protecting agent. It is therefore desirable to provide agents that have a high hydrogen-bond capacity as surface-treatment agents.

Owing to their structure, dendritic polymers exhibit a high density of terminations and therefore a high functional density at their periphery. It has therefore been envisaged to prepare functional dendritic polymers permitting the creation of hydrogen bonds with the aim of using them as surface-treatment agents.

The phosphonic acid function is particularly favourable for the formation of hydrogen bonds. It is therefore desirable to prepare dendritic polymers having phosphonic acid-functional terminations.

Dendritic polymers having various phosphorus-containing functions (phosphine, phosphinate, phosphate, phosphonate, phosphorane, spirophosphorane) have been described especially in the articles mentioned above or in French patent application FR 95 06 281.

However, no dendritic polymer having free phosphonic acid terminations, or optionally terminations in the form of salts or of the corresponding methyl ester, has been described. In fact, it has hitherto been impossible to prepare such functionalities on dendritic polymers. More precisely, it was impossible to prepare dendritic polymers exhibiting a phosphonic acid function starting from the corresponding alkyl esters. This has now been made possible starting from the corresponding methyl ester.

The inventors have now found a reaction that allows that type of terminal functionality of the methyl ester or phosphonic acid type to be obtained on dendritic polymers.

According to a first object, the present invention accordingly relates to dendritic polymers exhibiting a terminal function —PO(OMe)$_2$ or —PO(OH)$_2$ or the corresponding salts, at the termination of each branch.

According to a second object, the present invention relates also to a method for preparing such dendritic polymers.

According to another object, the present invention relates also to the use of the dendritic polymers according to the invention in the treatment of surfaces.

The present invention accordingly relates to dendritic polymers characterised in that they are composed of:
- a central core § of valence m;
- optionally generation chains branching around the core;
- an intermediate chain at the end of each bond around the core or optionally at the end of each generation chain, where appropriate; and
- a terminal group branching at the end of each intermediate chain, of formula:

(T)

wherein X represents a radical -Me, —H or /M$^+$, wherein M$^+$ is a cation,
n represents the generation of the dendritic polymer in question; it represents an integer from 0 to 12.
m represents an integer greater than or equal to 1.

Most frequently, the dendritic polymers of the invention comprise intermediate chains terminated by a terminal group:
- at the end of each generation chain that may be present; or
- at the end of each bond around the core that is not connected to a generation chain.

The dendritic polymers of the invention accordingly generally comprise m arms linked to the central core §, each of those arms being:
- an arm of type (1), that is to say an arm constituted by an intermediate chain terminated by a terminal group of formula (T); or
- an arm of type (2), that is to say an arm constituted by one or more generation chains comprising at its ends an intermediate chain terminated by a terminal group of formula (T).

According to a particular embodiment, the dendritic polymers comprise only arms of type (1) linked to the central core §.

According to another embodiment, the dendritic polymers comprise only arms of type (2) linked to the central core §.

Whatever the embodiment, the central core § is composed of at least one atom of valence m.

The central core § preferably has at least one phosphorus atom. The core § is preferably selected from the following groups: $SPCl_3$, $P_3N_3Cl_6$, $P_3N_3Cl_8$,

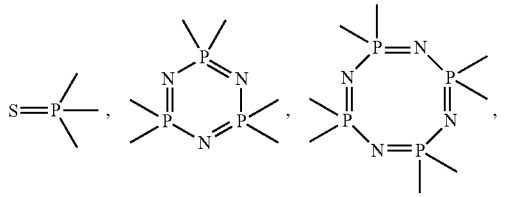

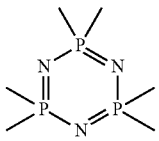

The central core § preferably has the formula:

n is preferably from 0 to 3.
m is preferably selected from 3, 4 and 6.
The dendritic polymers according to the invention preferably correspond to commercially available dendritic polymers to which the terminal group —P(=O)(OX)$_2$ has been grafted.
According to the invention, said commercially available dendritic polymers are selected especially from dendritic polymers of the type DAB-AM, PAMAM (especially Starbust®) having terminal functions —NH$_2$, —OH or —COON, or from dendritic polymers of the PMMH type, such as cyclophosphazene- or thiophosphoryl-PMMH, or are selected from:

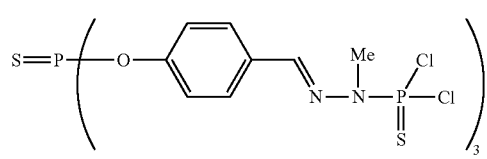
G$_1$

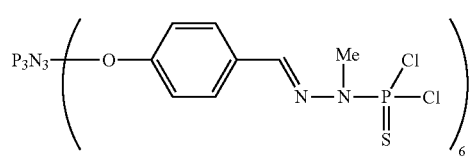
Gc$_1$

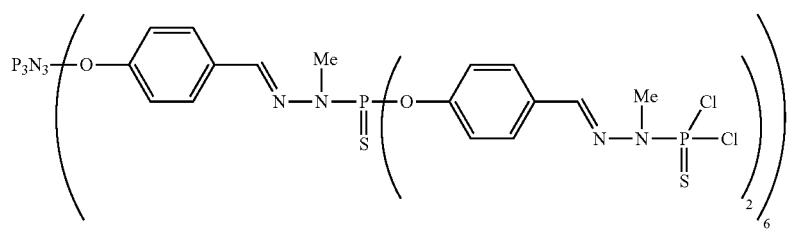
Gc$_2$

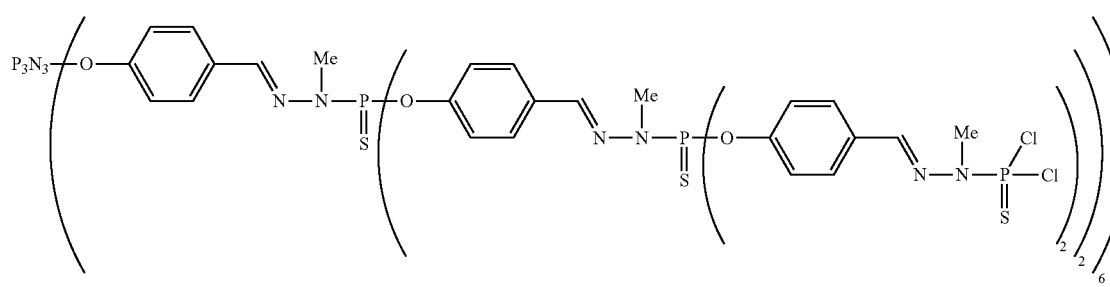
Gc$_3$

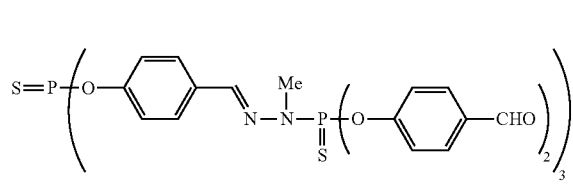
G'$_1$

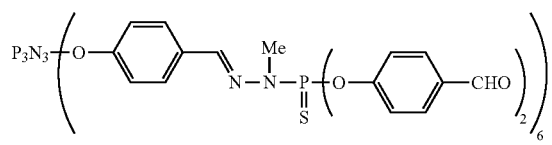
Gc'$_1$

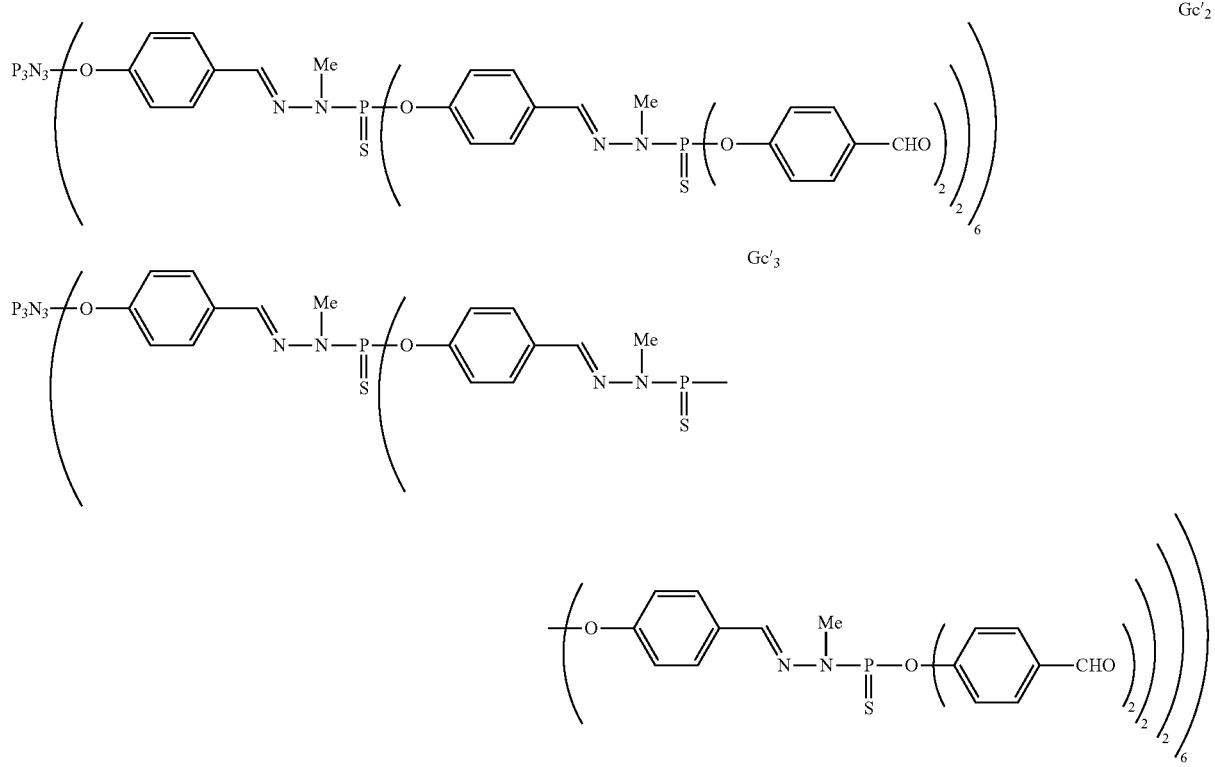

as well as the dendritic polymers of subsequent generations.

All those dendritic polymers are marketed by Aldrich.

M preferably represents an element of group IA, IIA, IIB or IIIA of the periodic table; M is preferably selected from sodium, potassium, calcium, barium, zinc, magnesium, lithium and aluminium atoms, more preferably from sodium, lithium and potassium.

$M^+$ is a cation of an atom, for example a metal atom, or a cation derived from any radical capable of being stable in cation form. Said cation can be selected especially from the ammonium salts, on their own or in a mixture, especially with cationic surfactants.

$M^+$ preferably represents the cation of a nitrogen-containing base, such as $HNEt_3^+$.

The generation chains are selected from any linear or branched hydrocarbon chain having from 1 to 12 chain members and optionally containing one or more double or triple bonds, it being possible for each of said chain members optionally to be selected from a heteroatom, a group Aryl, Heteroaryl, >C=O, >C=NR, it being possible for each chain member to be optionally substituted by one or more substituents selected from -Alkyl, -Hal, —$NO_2$, —NRR', —CN, —$CF_3$, —OH, —OAlkyl, -Aryl, -Aralkyl,
wherein R and R', which may be identical or different, each independently of the other represents a hydrogen atom or a radical -Alkyl, -Aryl, -Aralkyl;

The generation chains, which may be identical or different, are preferably represented by formula:

-A-B—C(D)=N—N(E)-(P(=G))< (C1)

wherein:

A represents an oxygen atom, a sulfur atom, a phosphorus atom or a radical —NR—;

B represents a radical -Aryl-, -Heteroaryl-, -Alkyl-, it being possible for each of those radicals to be optionally substituted by a Halogen atom or by a radical —$NO_2$, —NRR', —CN, —$CF_3$, —OH, -Alkyl, -Aryl, -Aralkyl;

C represents a carbon atom,

D and E, which may be identical or different, each independently of the other represents a hydrogen atom, a radical -Alkyl, —OAlkyl, -Aryl, -Aralkyl, it being possible for each of those radicals to be optionally substituted by a Halogen atom or by a radical —$NO_2$, —NRR', —CN, —$CF_3$, —OH, -Alkyl, -Aryl, -Aralkyl;

G represents a sulfur, oxygen, sulfur, selenium or tellurium atom or a radical =NR;

N represents a nitrogen atom;

P represents a phosphorus atom;

< represents the 2 bonds situated at the end of each generation chain.

In the general formula (C1) above, A preferably represents an oxygen atom.

In the general formula (C1) above, B preferably represents a phenyl ring optionally substituted by a halogen atom or by a radical —$NO_2$, —NRR', —CN, —$CF_3$, —OH, -Alkyl, -Aryl, -Aralkyl; more preferably, B represents an unsubstituted phenyl ring.

In the general formula (C1) mentioned above, D preferably represents a hydrogen atom.

In the general formula (C1) mentioned above, E preferably represents a radical -Alkyl.

In the general formula (C1) above, G preferably represents a sulfur atom.

According to another preferred aspect, the generation chains are represented by formula:

-A'-(C=O)—N(R)—B'—N< (C1')

wherein

A' and B' each independently of the other represents a radical -Alkyl, -Alkenyl, -Alkynyl, by one or more substituents selected from -Alkyl, -Hal, —NO₂, —NRR', —CN, —CF₃, —OH, -OAlkyl, -Aryl, -Aralkyl;

R, R' have the meaning defined hereinbefore.

A' preferably represents -Alkyl-, more preferably -Ethyl. B' preferably represents -Alkyl-, more preferably -Ethyl.

R preferably represents a hydrogen atom.

According to another preferred aspect, the generation chains are represented by formula:

-A"-N<                (C1")

wherein

A" represents a radical -Alkyl, -Alkenyl, -Alkynyl, by one or more substituents selected from -Alkyl, -Hal, —NO₂, —NRR', —CN, —CF₃, —OH, -OAlkyl, -Aryl, -Aralkyl, wherein RR' have the meaning defined hereinbefore.

A" preferably represents -Alkyl-, more preferably -Propyl-.

According to another preferred aspect, the dendritic polymers according to the invention of generation 1 do not comprise a generation chain. In particular, in the case where the generation chain is represented by formula (C1') or (C1"), the corresponding dendritic polymers of generation 1 do not comprise a generation chain.

The intermediate chains are selected from any linear or branched hydrocarbon chain having from 1 to 12 chain members and optionally containing one or more double or triple bonds, it being possible for each of said chain members optionally to be selected from a heteroatom, a group Aryl, Heteroaryl, >C=O, >C=NR, it being possible for each chain member to be optionally substituted by one or more substituents selected from -Alkyl, -Hal, —NO₂, —NRR', —CN, —CF₃, —OH, -OAlkyl, -Aryl, -Aralkyl, wherein R, R' have the meaning defined hereinbefore.

The intermediate chains preferably have a single bond at their ends.

The intermediate chains, which may be identical or different, are preferably represented by formula:

-J-K-L-                (C2)

wherein

J represents an oxygen atom, a sulfur atom or a radical —NR—;

K represents a radical -Aryl-, -Heteroaryl-, -Alkyl-, it being possible for each of those radicals to be optionally substituted by a Halogen atom or by a radical —NO₂, —NRR', —CN, —CF₃, —OH, -Alkyl, -Aryl, -Aralkyl;

L represents a linear or branched hydrocarbon chain having from 1 to 6 chain members and optionally containing one or more heteroatoms, and/or optionally containing one or more double or triple bonds, it being possible for each of said chain members to be optionally substituted by one or more substituents selected from —OH, —NRR', —OAlkyl, -Alkyl, -Hal, —NO₂, —CN, —CF₃, -Aryl, -Aralkyl;

R and R', which may be identical or different, each independently of the other represents a hydrogen atom or a radical -Alkyl, -Aryl, -Aralkyl.

In formula (C2) above, J preferably represents an oxygen atom.

In formula (C2) above, K preferably represents an optionally substituted phenyl ring; more preferably, K represents an unsubstituted phenyl ring.

In formula (C2) above, L preferably represents a radical -Alkyl-, -Alkenyl- or -Alkynyl-, each of which may optionally be substituted by one or more substituents selected from —OH, —NRR', -OAlkyl; more preferably, L represents a radical -Alkyl-optionally substituted by a radical —OH, or L represents a radical -Alkenyl-; even more preferably, L represents a radical -Alkyl- optionally substituted by a radical —OH.

According to another preferred aspect, the intermediate chains can be represented by formula (C2'):

-L"-                (C2')

wherein L" represents an -Alkyl- chain having from 1 to 6 chain members, optionally substituted by one or more substituents selected from —OH, —NRR', —OAlkyl; even more preferably, L represents a radical -Alkyl-, preferably -Methyl-.

The generation chains are preferably identical.

In formulae (C1) and (C2) mentioned above, J and K are preferably equal to A and B, respectively.

The dendritic polymers according to the invention can preferably be represented by the following formula (I):

$$\S\text{-}\{\{A\text{-}B\text{—}C(D)\text{=}N\text{—}N(E)\text{-}(P(=G))<\}^n[J\text{-}K\text{-}L\text{-}PO_3X_2]_2\}_m \quad (I\text{-}1)$$

in which:

§, A, B, C, D, E, G, N, P, J, K, L, X, m, n, < have the meaning defined hereinbefore.

According to another preferred aspect, the dendritic polymers according to the invention can be represented by the following formula (I-2):

$$\S\text{-}\{\{A'\text{-}(C\text{=}O)\text{—}N(R)\text{—}B'\text{—}NH\text{-}\}^n[L''\text{-}PO_3X_2]\}_m \quad (I\text{-}2)$$

in which:

§, A', B', C, N, P, X, L", m, n have the meaning defined hereinbefore.

According to another preferred aspect, the dendritic polymers according to the invention can be represented by the following formula (I-3):

$$\S\text{-}\{\{A''\text{—}NH\text{-}\}^n[L''\text{-}PO_3X_2]\}_m \quad (I\text{-}3)$$

in which:

§, A", N, P, X, L", m, n have the meaning defined hereinbefore.

According to the present invention, { }ⁿ denotes the branched structure of generation n of said radical.

According to the present invention, the radical -Alk, -Alkyl or -Alkyl-represents an alkyl radical, that is to say a straight-chained or branched saturated hydrocarbon radical having from 1 to 20 carbon atoms, preferably from 1 to 5 carbon atoms.

In the case of linear radicals, particular mention may be made of the radicals methyl, ethyl, propyl, butyl, pentyl, hexyl, octyl, nonyl, decyl, dodecyl, hexadecyl and octadecyl.

In the case of branched radicals or radicals substituted by one or more alkyl radicals, particular mention may be made of the radicals isopropyl, tert-butyl, 2-ethylhexyl, 2-methylbutyl, 2-methylphenyl, 1-methylpentyl and 3-methylheptyl.

-Alkenyl or -Alkenyl- denotes an aliphatic hydrocarbon group that contains at least one carbon-carbon double bond and that can be linear or branched and has from approximately 2 to approximately 15 carbon atoms in the chain. Preferred alkenyl groups have from 2 to approximately 12 carbon atoms in the chain; and more preferably, from approximately 2 to approximately 4 carbon atoms in the chain. Branched means that one or more lower alkyl groups, such as methyl, ethyl or propyl, are bonded to a linear alkenyl chain. Typical examples of alkenyl groups include ethenyl, propenyl, n-butenyl, isobutenyl, 3-methylbut-2-enyl, n-pentenyl, heptenyl, octenyl, cyclohexylbutenyl and decenyl.

Alkynyl or -Alkynyl- denotes an aliphatic hydrocarbon group that contains at least one carbon-carbon triple bond and that can be linear or branched and has from 2 to approximately 15 carbon atoms in the chain. Preferred alkynyl groups have from 2 to approximately 12 carbon atoms in the chain; more preferably, from approximately 2 to approximately 4 carbon atoms in the chain. Branched means that one or more lower alkyl groups, such as methyl, ethyl or propyl, are bonded to a linear alkynyl chain. Typical examples of alkynyl groups include ethynyl, propynyl, n-butynyl, 2-butynyl, 3-methylbutynyl, n-pentynyl, heptynyl, octynyl and decynyl.

Among the Halogen atoms there may be mentioned more especially fluorine, chlorine, bromine and iodine atoms, preferably fluorine.

The radical -Aryl or -Aryl- represents an Aryl radical, that is to say a mono- or bi-cyclic aromatic hydrocarbon system having from 6 to 10 carbon atoms.

Among the Aryl radicals there may be mentioned especially the phenyl or naphthyl radical, more especially substituted by at least one halogen atom.

Among the radicals -Aralkyl (-AlkylAryl) there may be mentioned especially the benzyl or phenethyl radical.

The term "Heteroatom" denotes a nitrogen, oxygen, silicon, phosphorus or sulfur atom.

—Heteroaryl or -Heteroaryl—denotes a Heteroaryl radical, that is to say a mono- or bi-cyclic aromatic system comprising one or more heteroatoms selected from nitrogen, oxygen and sulfur and having from 5 to 10 carbon atoms. Among the Heteroaryl radicals there may be mentioned pyrazinyl, thienyl, oxazolyl, furazanyl, pyrrolyl, 1,2,4-thiadiazolyl, naphthyridinyl, pyridazinyl, quinoxalinyl, phthalazinyl, imidazo[1,2-a]pyridine, imidazo[2,1-b]thiazolyl, cinnolinyl, triazinyl, benzofurazanyl, azaindolyl, benzimidazolyl, benzothienyl, thienopyridyl, thienopyrimidinyl, pyrrolopyridyl, imidazopyridyl, benzoazaindole, 1,2,4-triazinyl, benzothiazolyl, furanyl, imidazolyl, indolyl, triazolyl, tetrazolyl, indolizinyl, isoxazolyl, isoquinolinyl, isothiazolyl, oxadiazolyl, pyrazinyl, pyridazinyl, pyrazolyl, pyridyl, pyrimidinyl, purinyl, quinazolinyl, quinolinyl, isoquinolyl, 1,3,4-thiadiazolyl, thiazolyl, triazinyl, isothiazolyl, carbazolyl, as well as the corresponding groups obtained from the fusion thereof or from fusion with the phenyl ring. Preferred Heteroaryl groups include thienyl, pyrrolyl, quinoxalinyl, furanyl, imidazolyl, indolyl, isoxazolyl, isothiazolyl, pyrazinyl, pyridazinyl, pyrazolyl, pyridyl, pyrimidinyl, quinazolinyl, quinolinyl, thiazolyl, carbazolyl, thiadiazolyl, and the groups obtained from the fusion thereof with a phenyl ring, more especially quinolinyl, carbazolyl, thiadiazolyl.

According to the invention, "corresponding dendritic polymer" is understood as meaning the dendritic polymer of the same generation that possesses the same cores, generation chains, intermediate chains and distinct terminal groups.

Salts of the compounds according to the invention refer to the addition salts of the compounds of the present invention. Those salts can be prepared in situ during the final isolation and purification of the compounds. The addition salts can be prepared by separately reacting the purified compound in its acid form with an organic or inorganic base and isolating the salt so formed. The addition salts include amine and metallic salts. Suitable metallic salts include sodium, potassium, calcium, barium, zinc, magnesium and aluminium salts. Sodium and potassium salts are preferred. Suitable inorganic basic addition salts are prepared from metal bases, which include sodium hydride, sodium hydroxide, potassium hydroxide, calcium hydroxide, aluminium hydroxide, lithium hydroxide, magnesium hydroxide, zinc hydroxide.

According to another object, the present invention relates also to a method for preparing the above-mentioned dendritic polymers.

The compounds of the invention can be prepared by application or adaptation of any method that is known per se by and/or that is within the scope of the person skilled in the art and that permits the grafting of —$PO_3X_2$ functions, especially those described by Larock in *Comprehensive Organic Transformations*, VCH Pub., 1989, or by application or adaptation of the methods described in the Examples which follow.

In the reactions described hereinbelow, it may be necessary to protect the reactive functional groups, for example the hydroxy, amino, imino, thio, carboxy groups, when they are desired in the final product, in order to avoid their undesirable participation in the reactions. Conventional protecting groups can be used in accordance with standard practice; for examples see T. W. Green and P. G. M. Wuts in *Protective Groups in Organic Chemistry*, John Wiley and Sons, 1991; J. F. W. McOmie in *Protective Groups in Organic Chemistry*, Plenum Press, 1973.

According to the invention, the method for preparing a dendritic polymer according to the invention comprising the terminal group —$P(=O)(OX)_2$ comprises:

(i) reacting the corresponding dendritic polymer having a terminal function —CHO, —CH=NR or —$P(=G)Cl_2$ with a corresponding compound having a —$PO_3Me_2$ functionality;

(ii) optionally followed, when X represents H or M, by a step which comprises converting the dendritic polymer obtained in (i) having a —$PO_3Me_2$ termination into the corresponding dendritic polymer having a —$P(=O)(OH)_2$ termination, (iii) optionally followed, when X represents M, by a step which comprises converting the dendritic polymer obtained in (ii) having a $(OH)_2$ termination into the salt of the corresponding dendritic polymer having a $P(=O)(OM)_2$ termination.

According to the invention, step (i) comprises reacting the corresponding dendritic polymer of the same generation n having a terminal function —CHO, —CH=NR or —$(P(=S)Cl_2$ with a compound of formula Z—$PO_3Me_2$, wherein Z represents:

either —H when the function is —CHO or —CH=NR, or the intermediate chain defined hereinbefore when said function represents —$(P(=S)Cl_2$.

According to a first alternative, step (i) comprises treating the corresponding dendritic polymer having a —CHO or —CH=NR termination with $HPO_3Me_2$ by application or adaptation of the method described in J. Org. Chem. 1997, 62, 4834. More precisely, that reaction is carried out with stirring, in solution in a polar aprotic solvent, such as THF, chloroform, dichloromethane, acetonitrile, preferably without a solvent, in the presence of an organic or inorganic base, preferably a nitrogen-containing base, such as triethylamine, at a temperature of from −80° C. to 100° C., preferably at ambient temperature.

The compound of formula $HPO_3Me_2$ is commercially available (Aldrich) or can be prepared according to methods known per se.

According to a second alternative, step (i) comprises treating a starting dendritic polymer having the terminal function —$(P(=S)Cl_2$ with a compound of formula Z—$PO_3Me_2$, wherein Z represents the intermediate chain defined hereinbefore.

That reaction is carried out with stirring, in solution in a polar aprotic solvent, such as THF, chloroform, dichloromethane, acetonitrile, acetone, DMF, preferably THF, in the presence of an organic or inorganic base, preferably of the carbonate type, such as cesium carbonate, at a temperature of from −80° C. to 100° C., preferably at ambient temperature.

(ii) optionally followed, when X represents H or M, by a step which comprises converting the dendritic polymer obtained in (i) having a —PO$_3$Me$_2$ termination into the corresponding dendritic polymer having a —PO$_3$H$_2$ termination, by the action of a trimethylsilane halide, preferably trimethylsilane bromide (Me$_3$SiBr), in a polar aprotic organic solvent, such as chloroform, dichloromethane or acetonitrile, preferably acetonitrile. The procedure is preferably carried out by slowly adding the trimethylsilane halide while keeping the reaction mixture at a temperature of from −80° C. to 100° C., preferably at approximately 0° C.

followed by the action of anhydrous MeOH, which is added to the reaction mixture;

(iii) optionally followed, when X represents M, by a step which comprises converting the dendritic polymer obtained in (ii) having a —PO$_3$H$_2$ termination into the salt of the corresponding dendritic polymer having a —PO$_3$M$_2$ termination.

More precisely, according to the invention, when the dendritic polymer has the formula (I-1)

§-{{A-B—C(D)=N—N(E)-(P(=G))<}$^n$[J-K-L-PO$_3$X$_2$]$_2$}$_m$     (I-1)

in which §, A, B, C, D, E, G, N, P, J, K, L, X, m, n, < have the meaning defined hereinbefore, step (i) comprises reacting with the corresponding dendritic polymer n of formula §-{{A-B—C(D)=N—N(E)-(P(=G))<}$^n$—Y$_2$}$_m$     (II-1)

wherein Y represents:

either -J-K-L', wherein L' represents a radical —CHO or —CH=NR;

or —Cl;

a compound of formula Z—PO$_3$Me$_2$, wherein Z represents:

either H— when Y represents -J-K-L';

or H-J-K-L- when Y represents Cl;

(ii) optionally followed, when X represents H or M, by a step which comprises converting the dendritic polymer of formula (III-1) obtained in (i) in which X represents a Methyl radical into the corresponding dendritic polymer of formula (I) in which X represents a hydrogen atom, according to the following reaction scheme:

§—{{A—B—C(D)=N—N(E)—(P(=G))<}$^n$[J—K—L—PO$_3$Me$_2$]$_2$}$_m$     (III-1)
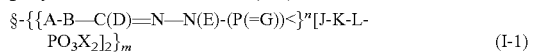
(IV-1)

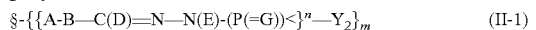

§—{{A—B—C(D)=N—N(E)—(P(=G))<}$^n$[J—K—L—PO$_3$H$_2$]$_2$}$_m$ in which §, A, B, C, D, E, G, N, P, J, K, L, n, m, < have the meaning defined hereinbefore, (iii) optionally followed, when X represents M, by a step which comprises converting the dendritic polymer of formula (IV) obtained in (ii) into the corresponding salt.

The product of formula (III-1) is obtained according to step (i) by one or other of the following methods:

According to a first alternative of step (i), the product of formula (III-1) is obtained according to the following reaction:

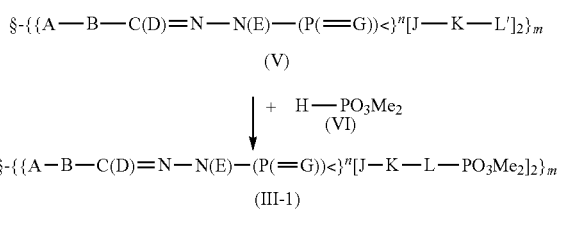

§-{{A—B—C(D)=N—N(E)—(P(=G))<}$^n$[J—K—L']$_2$}$_m$     (V)

+ H—PO$_3$Me$_2$ (VI)

§-{{A—B—C(D)=N—N(E)—(P(=G))<}$^n$[J—K—L—PO$_3$Me$_2$]$_2$}$_m$     (III-1)

wherein

§, A, B, C, D, E, G, N, P, J, K, L, L', m, n, < have the meaning defined hereinbefore.

That reaction can be carried out by application or adaptation of the method described in *J. Org. Chem.* 1997, 62, 4834.

More precisely, that reaction is carried out with stirring, optionally in solution in a polar aprotic solvent, such as THF, dichloromethane, chloroform or acetonitrile, preferably without a solvent, in the presence of an organic or inorganic base, preferably a nitrogen-containing base, such as triethylamine, at a temperature of from −80° C. to 1000° C., preferably at ambient temperature.

The compound of formula (VI) is commercially available (Aldrich) or can be prepared according to methods known per se.

The dendritic polymers of formula (V-1) are commercially available (Aldrich) or can be prepared according to methods known per se.

According to a second alternative, the compound of formula (III-1) is obtained according to the following reaction:

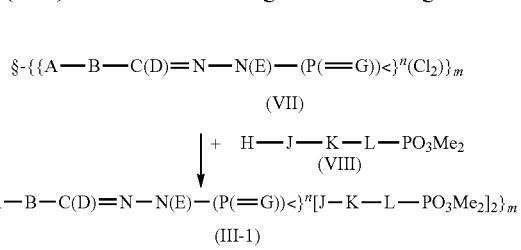

§-{{A—B—C(D)=N—N(E)—(P(=G))<}$^n$(Cl$_2$)}$_m$     (VII)

+ H—J—K—L—PO$_3$Me$_2$ (VIII)

§-{,A—B—C(D)=N—N(E)—(P(=G))<}$^n$[J—K—L—PO$_3$Me$_2$]$_2$}$_m$     (III-1)

wherein

§, A, B, C, D, E, G, N, P, J, K, L, m, n have the meaning defined hereinbefore.

That reaction is carried out with stirring, in solution in a polar aprotic solvent, such as THF, chloroform, dichloromethane, acetonitrile, acetone, DMF, preferably THF, in the presence of an organic or inorganic base, preferably of the carbonate type, such as cesium carbonate, at a temperature of from −80° C. to 100° C., preferably at ambient temperature.

The dendritic polymers of formula (VII) are commercially available (Aldrich) or can be prepared according to methods known per se.

The dendritic polymers of formulae (V) and (VII) can be selected especially from:

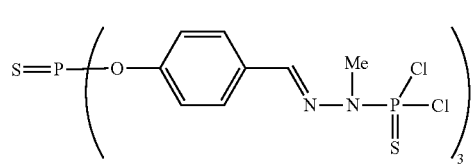

G₁

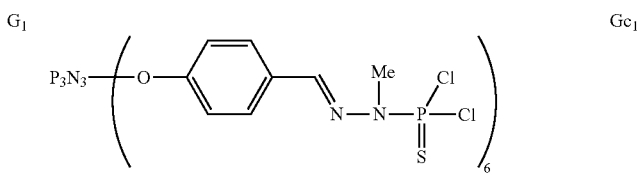

Gc₁

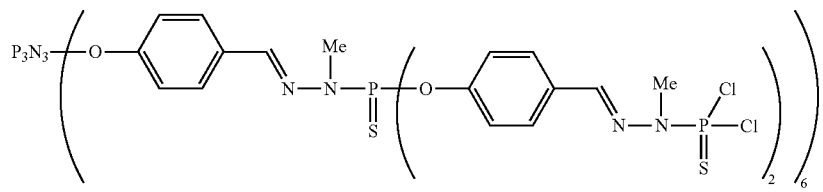

Gc₂

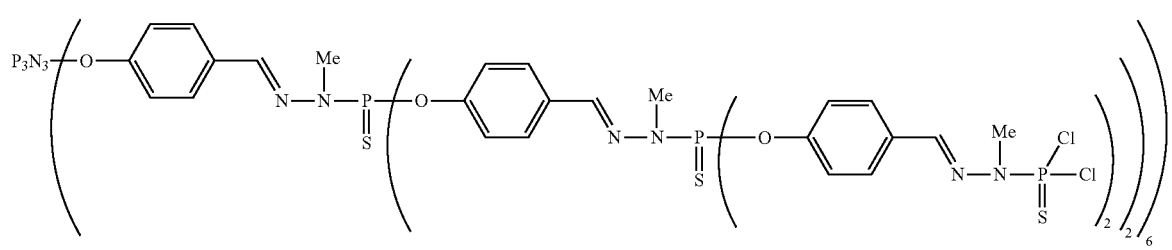

Gc3

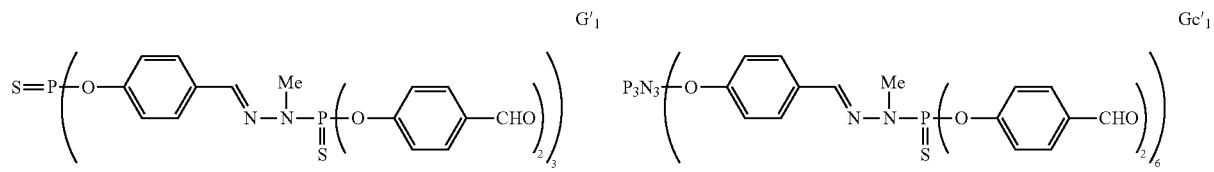

G'₁

Gc'₁

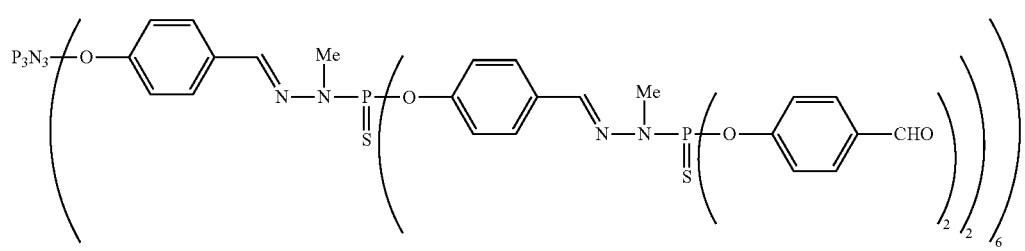

Gc'₂

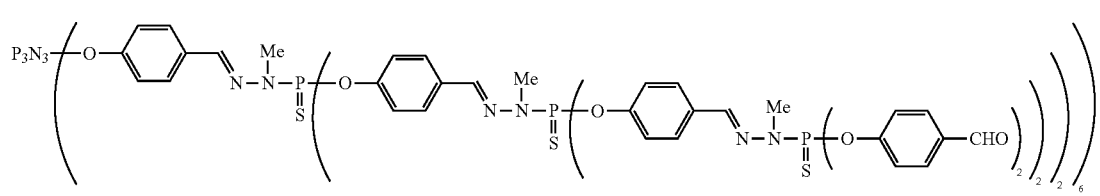

Gc'₃

More precisely, when the dendritic polymers according to the invention are represented by the following formula (I-2):

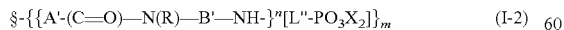  (I-2)

in which §, A', B', C, N, P, X, L'', m, n have the meaning defined hereinbefore.

Or the following formula (I-3):

  (I-3)

in which §, A'', N, P, X, L'', m, n have the meaning defined hereinbefore, the method comprises:

step (i), which comprises reacting the corresponding dendritic polymer n of formula

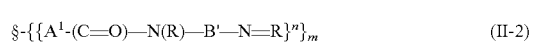  (II-2)

or §-{{A''-N=R}ⁿ}ₘ  (I-3)

wherein R is a radical >Alkyl,
with a compound of formula H—PO₃Me₂ (VI).

That reaction can be carried out by application or adaptation of the method described in *J. Org. Chem.* 1997, 62, 4834.

More precisely, that reaction is carried out with stirring, optionally in solution in a polar aprotic solvent, such as THF, chloroform, dichloromethane, acetonitrile, preferably without a solvent, in the presence of an organic or inorganic base, preferably a nitrogen-containing base, such as triethylamine, at a temperature of from −80° C. to 100° C., preferably at ambient temperature.

The compound of formula (VI) is commercially available (Aldrich) or can be prepared according to methods known per se. The dendritic polymers of formula

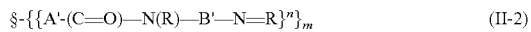

can be obtained starting from the corresponding commercial dendritic polymers of formula

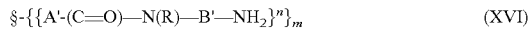

by application or adaptation of any reaction known per se which allows the terminal group —$NH_2$ to be converted into the required terminal function —N=R. Such methods, which are within the scope of the person skilled in the art, have been described especially by Larock of al. (supra).

The dendritic polymers of formulae (XVI) and (XVII) are commercially available and can be selected especially from the dendritic polymers of the DAB or PAMAM type.

(ii) optionally followed, when X represents H or M, by a step which comprises converting the dendritic polymer of formula (III-2) or (III-3) obtained in (i) in which X represents a Methyl radical into the corresponding dendritic polymer of formula (I) in which X represents a hydrogen atom, according to the following reaction scheme:

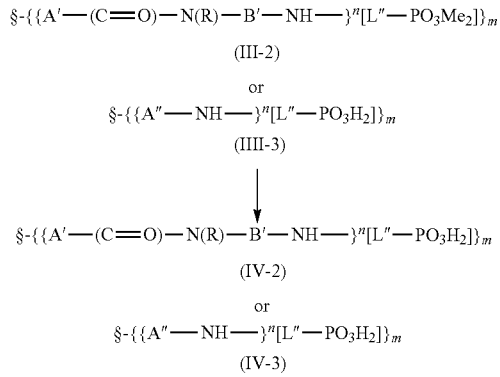

(iii) optionally followed, when X represents M, by a step which comprises converting the dendritic polymer of formula (IV) obtained in (ii) into the corresponding salt.

In all cases, the reaction (ii) is carried out:
by the action of a trimethylsilane halide, preferably trimethylsilane bromide ($Me_3SiBr$), in a polar aprotic organic solvent, such as acetonitrile, chloroform or dichloromethane, preferably acetonitrile. The procedure is preferably carried out by slowly adding the trimethylsilane halide while keeping the reaction mixture at a temperature of from −80° C. to 100° C., preferably at approximately 0° C.
followed by the action of anhydrous MeOH, which is added to the reaction mixture.

In step (iii), the acid salts of the compounds according to the invention can be obtained starting from the compounds according to the invention having a terminal chain in which Z represents a hydrogen atom, by application or adaptation of known processes, by addition of a base. The procedure is preferably carried out in solution, with stirring, in a suitable non-polar protic or aprotic solvent, such as alcohols, water, THF, dichloromethane, chloroform, acetonitrile, DMF, water, preferably water, in the presence of an organic or inorganic base, such as hydroxides, carbonates, nitrogen-containing bases, preferably sodium, lithium or potassium hydroxide, depending on the salt that is desired.

When the starting dendritic polymers that are used have terminal groups other than the terminal functions described above for the dendritic polymers of formula (II-1), (II-2) or (II-3), the method according to the invention comprises an additional preliminary step which allows said groups to be converted into said required functions. For example, in the case of dendritic polymers having terminal groups of the carboxylic acid or hydroxyl type, it is sufficient to carry out any reaction allowing said groups of the carboxylic acid or hydroxyl type to be converted into functions of the —$NH_2$, —CHO, —C=NR or —$PSCl_2$ type corresponding to the dendritic polymers of formula (II-1), (II-2) or (II-3). Such reactions are known to the person skilled in the art and/or can be carried out by application or adaptation of those discussed by Larock et al. (supra).

In order to obtain a dendritic polymer according to the invention of generation 0, the above reactions can be carried out in the same manner by proceeding from the core, which has the required functionality. For example, the generation reactions can be carried out starting from a $PSCl_3$, $P_3N_3Cl_6$, $P_4N_4Cl_8$ or

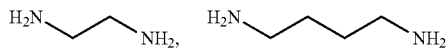

core.

The compounds of formula (VIII) are novel and accordingly also form part of the present invention.

The present invention accordingly relates also to compounds of formula (VIII):

in which

Z represents H or a protecting group for the function -JH; such protecting groups are known per se and can be identified especially from Greene et al. or McOmie et al. mentioned hereinbefore. Preferably, when J represents an oxygen atom, Z represents the group TBDMS (tert-butyl-dimethyl-silyl radical).

J represents an oxygen atom, a sulfur atom or a radical —NR—;

K represents a radical -Aryl-, -Heteroaryl-, -Alkyl-, each of which may optionally be substituted by a Halogen atom or by a radical —$NO_2$, —NRR', —CN, —$CF_3$, —OH, -Alkyl, -Aryl, -Aralkyl;

L represents a linear or branched hydrocarbon chain having from 1 to 6 chain members, it being possible for each of said chain members optionally to be selected from a heteroatom, preferably nitrogen, and/or optionally containing one or more double or triple bonds, it being possible for each of said chain members to be optionally substituted by one or more substituents selected from —OH, —NRR', —OAlkyl, -Alkyl, -Hal, —$NO_2$, —CN, —$CF_3$, -Aryl, -Aralkyl.

R, R', which may be identical or different, each independently of the other represents a hydrogen atom or a radical -Alkyl, -Aryl, -Aralkyl.

In formula (VIII) above, J preferably represents an oxygen atom.

In formula (VIII) above, K preferably represents an optionally substituted phenyl ring; more preferably, K represents an unsubstituted phenyl ring.

In formula (VIII) above, L preferably represents a radical -Alkyl- optionally substituted by a radical —OH, or L represents a radical -Alkenyl-; more preferably, L represents a radical -Alkyl-.

The compounds of formula (VIII) can be obtained as follows:

Z-J-K-L-Hal (IX)→Z-J-K-L- PO₃Me₂     (VIII)

wherein Z, J, K, L have the meaning defined hereinbefore, Hal represents a halogen atom, preferably bromine.

In the case where, in formula (VIII), Z=H, the product of formula (VIII) is obtained starting from the product of formula (VIII) wherein Z is a protecting group, by application or adaptation of any known method for deprotecting the protecting group Z, especially those described in Greene et al. or McOmie et al. (supra). In particular, in the case where J=O and Z=TBDMS, the procedure is carried out by the action of tetrabutylammonium fluoride, preferably 2 equivalents, with stirring, in solution in a polar aprotic solvent, such as THF, chloroform, dichloromethane, acetonitrile, DMF, preferably THF, at a temperature of from −80° C. to 100° C., preferably at ambient temperature.

The product of formula (VIII) wherein Z is a protecting group is obtained starting from the product of formula (IX) by application or adaptation of Arbuzow's reaction, which is described especially in B. A. Arbuzow, Pure appl. Chem. 1964, 9, 307, or any equivalent reaction. In particular, the product of formula (IX) is reacted in the presence of trimethyl phosphite of formula P(OMe)₃     (X), with stirring, in solution in a polar aprotic solvent, such as THF, chloroform, dichloromethane, acetonitrile, preferably without a solvent, at a temperature of from −80° C. to 150° C., preferably at approximately 80° C.

The product of formula (IX) can be obtained by application or adaptation of the method described by Olszewski et al. in *J. Org. Chem.* 1994, 59, 4285-4296.

In particular, the procedure can be carried out as follows:

H-J-K-L"-CHO(XI)→Z-J-K-L"-CHO(XII)→Z-J-K-L-OH(XIII)→Z-J-K-L-COCF₃(XIV)→Z-J-K-L-Hal     (IX)

wherein Z, J, K, L, Hal have the meaning defined hereinbefore and L" represents a radical corresponding to L wherein a hydrogen atom and a carbon atom have been formally removed.

The product of formula (IX) is obtained starting from the product of formula (XIV) by application or adaptation of any known reaction for substitution of the trifluoroacetate group by a halogen atom, especially bromine, for example by the action of LiBr, with stirring, in solution in a polar aprotic solvent, such as THF, chloroform, dichloromethane, acetonitrile, DMF, preferably THF, at reflux, for a period of time necessary to obtain an acceptable reaction yield, for example from 5 to 20 hours.

The product of formula (XIV) is obtained starting from the product of formula (XIII) by application or adaptation of any known reaction for substitution of the hydroxy function by a trifluoroacetate radical, especially by the action of trifluoroacetic anhydride (CF₃CO)₂O, with stirring, in solution in a polar aprotic solvent, such as THF, chloroform, dichloromethane, acetonitrile, DMF, preferably THF, at reflux, for a period of time necessary to obtain an acceptable reaction yield, for example from 5 minutes to 5 hours.

The product of formula (XIII) is obtained starting from the product of formula (XII) by application or adaptation of any known reaction for reducing the aldehyde function to a hydroxy function, especially by the action of a reducing agent such as NaBH₄ or any equivalent agent, in solution in a polar protic or aprotic solvent, such as ether, THF, alcohols, water, preferably a THF/EtOH mixture (5/1), at reflux, for a period of time necessary to obtain an acceptable reaction yield, for example from 1 hour to 10 days.

The product of formula (XII) is obtained starting from the product of formula (XI) by application or adaptation of any known reaction for protecting the -JH function by a protecting group Z or any other suitable protecting group, by application or adaptation of the methods described by Green et al. or Wuts et al. mentioned hereinbefore. In the case of protection by TBDMS, the procedure is carried out especially by the action of Cl-TBDMS (XV), with stirring, in solution in a polar aprotic solvent, such as THF, chloroform, dichloromethane, acetonitrile, DMF, preferably dichloromethane, in the presence of a base such as triethylamine (2 equivalents), at a temperature of from −80° C. to 100° C., preferably at ambient temperature.

The product of formula (XI) is commercial and can be obtained especially from Aldrich.

In the description of the method hereinbefore, two groups are said to be "corresponding" when they are both included in a starting product and an end product, and their structure is identical and can be derived one from the other.

Said method may optionally also include a step which comprises isolating the resulting product or the final product formed as an intermediate following steps (i), (ii) or (iii).

The compound so prepared can be recovered from the reaction mixture by conventional methods. For example, the compounds can be recovered by removing the solvent from the reaction mixture by distillation or, if necessary, after removal of the solvent from the mixture of the solution by distillation, by pouring the remainder into water and then carrying out extraction using an organic solvent that is immiscible in water, and removing the solvent from the extract by distillation. Furthermore, the product can, if desired, be purified further by various techniques, such as recrystallisation, reprecipitation or the various chromatographic techniques, especially column chromatography or preparative thin-layer chromatography.

It will be appreciated that the compounds used according to the present invention can contain asymmetric centres. Such asymmetric centres can have the R or S configuration, independently. It will be apparent to the person skilled in the art that some compounds used according to the invention can also have geometrical isomerism. It must be understood that the present invention includes individual geometrical isomers and stereoisomers, and mixtures thereof, including racemic mixtures, of compounds of formula (I) above. Such isomers can be separated from their mixtures by application or adaptation of known processes, for example chromatographic techniques or recrystallisation techniques, or they are prepared separately starting from the appropriate isomers of their intermediates.

For the purposes of this text, it will be understood that the tautomeric forms are included in the mention of a given group, for example thio/mercapto or oxo/hydroxy.

The compounds used according to the present invention can readily be prepared, or formed during the method of the invention, in the form of solvates (for example hydrates). The hydrates of the compounds used according to the present invention can readily be prepared by recrystallisation from an aqueous/organic solvent mixture, using organic solvents such as dioxane, tetrahydrofuran or methanol.

The base products or the intermediates can be prepared by application or adaptation of known processes, for example processes as described in the Reference Examples or their obvious chemical equivalents.

The inventors have found that the dendritic polymers according to the invention have particularly advantageous properties for the treatment of surfaces, especially of metal surfaces or surfaces based on silicon or on oxides, such as silica, titanium oxide, zirconium oxide, etc. They can be used especially as an additive in any composition that is to be in contact with or to treat said surfaces, for example as an anticorrosive agent, a lubricating agent, a scale preventer or a flame retardant, especially for plastics polymers.

EXAMPLES

General

The reactions were carried out under a dry argon atmosphere (argon U, Liquid Air). The following solvents were dried and distilled under argon immediately prior to use, according to the techniques described by Perrin et al., *Purification of Laboratory Chemicals, Third Edition*; Press, P., Ed.: Oxford, 1988: tetrahydrofuran, dichloromethane, acetonitrile, pentane, toluene, diethyl ether, chloroform, triethylamine, pyridine.

Thin-layer chromatographies were carried out on silica-coated aluminium plates of type Merck Kieselgel $60F_{254}$.

NMR spectra were recorded on Brüker devices (AC200, AM250, DPX 300). Chemical shifts are expressed in parts per million (ppm) relative to 85% phosphoric acid in water for $^{31}P$ NMR and relative to tetramethylsilane for $^1H$ and $^{13}C$ NMR. The following abbreviations have been used to express the multiplicity of the signals: s (singlet), d (doublet), dl (broad doublet), dd (double doublet), syst. AB (AB system), t (triplet), td (double triplet), q (quadruplet), hept (heptuplet), m (unresolved multiplet).

Infra-red vibrational spectroscopy was carried out on a Perkin Elmer FT 1725× spectrometer. UV-visible spectroscopy was carried out on a HP 4852A device. Thermogravimetric measurements were carried out on a Netzch DSC 204 or Setaram TGA 92-16.18 device.

Numbering Used for NMR Allocation:

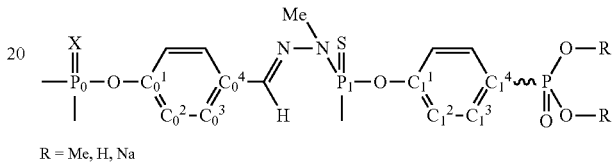

R = Me, H, Na

Example of Numbering for a First Generation Dendritic Polymer

Structures of the Various Dendritic Polymers Used as Starting Material

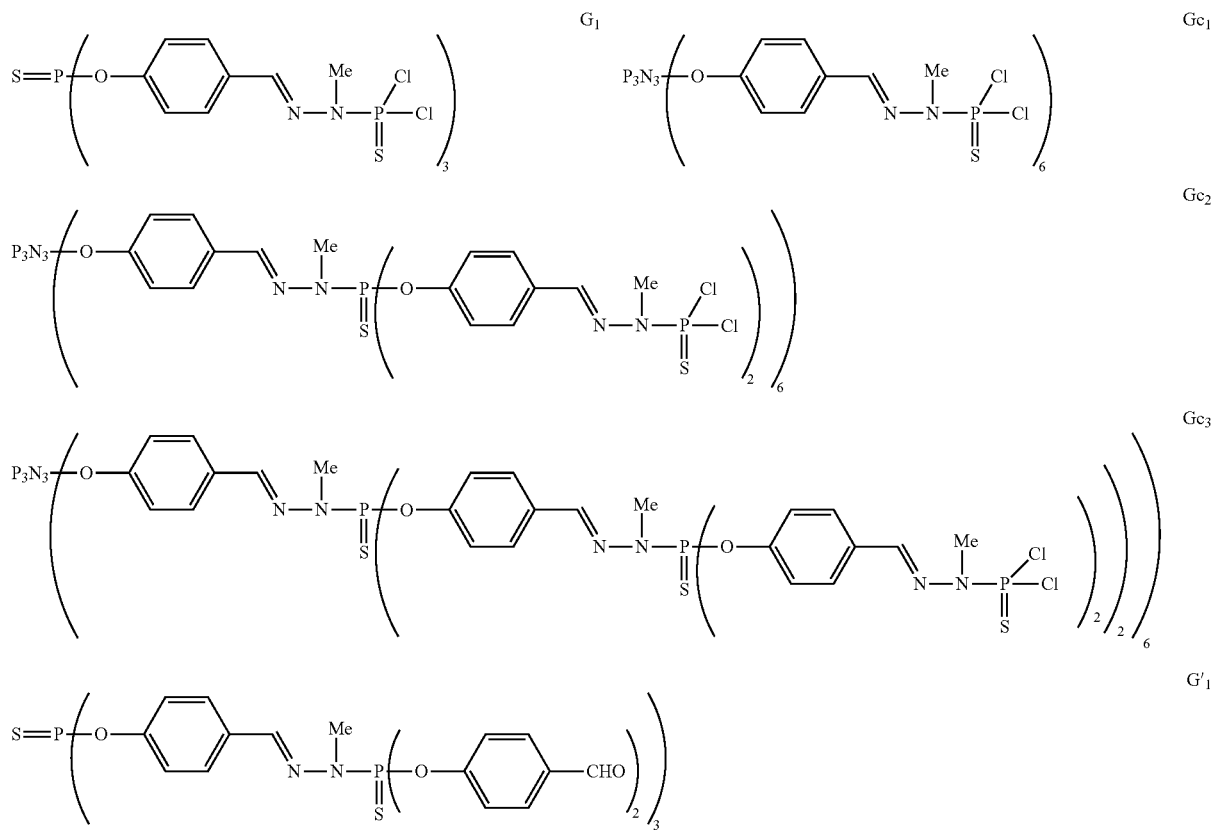

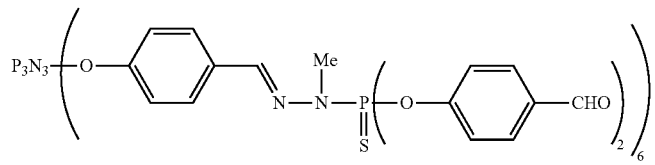
Gc'₁

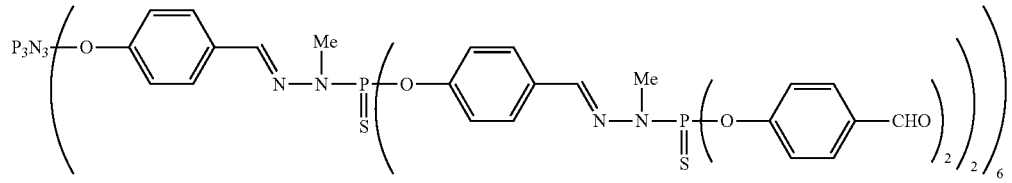
Gc'₂

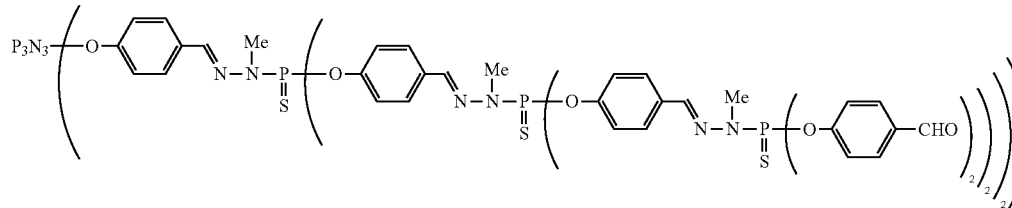
Gc'₃

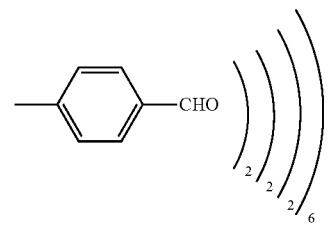

Example 1

Synthesis of the First Generation Dendritic Polymer (Core P=S) Having α-hydroxy dimethylphosphonate Ends The dendritic polymer G'₁ (0.14 mmol, 200 mg) is dissolved in 0.2 ml of THF with distilled triethylamine (0.126 mmol, 4.5 µl) and dimethyl phosphite (1.26 mmol, 115 µl). The mixture is stirred magnetically for 12 hours. The resulting paste is then washed with a THF/Et₂O mixture: 1/1 to give a white powder. The final product is isolated in a final yield of 72%.

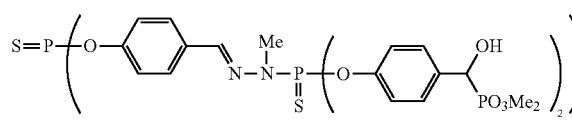

$^{31}P\text{-}\{^1H\}$ NMR (DMSO d6): δ=27.10 (s, P(O)(O—CH₃)₂), 56.10 (s, P₀), 65.91 (s, P₁) ppm.

$^1H$ NMR (DMSO d6): δ=3.34 (d, $^3J_{HP}$=9.8 Hz, 9H, CH₃—N—P₁), 3.52 (d, 18H, $^3J_{HP}$=10.3 Hz, P(O)—O—CH₃), 3.57 (d, 18H, $^3J_{HP}$=11.6 Hz, P(O)—O—CH₃), 5.01 (dd, $^3J_{HH}$=4.5 Hz, $^2J_{HP}$=13.0 Hz, 6H, CH—P(O)), 6.33 (dd, $^3J_{HH}$=5.6 Hz, $^3J_{HP}$=15.7 Hz, 6H, OH), 7.18-7.93 (m, 39H, H$_{arom}$, CH=N) ppm.

$^{13}C\text{-}\{^1H\}$ NMR (DMSO d6): δ=33.9 (d, $^2J_{CP}$=12.1 Hz, CH₃—N—P₁), 53.7 (d, $^2J_{CP}$=6.8 Hz, CH₃—O—P(O)), 54.2 (d, $^2J_{CP}$=7.0 Hz, CH₃—O—P(O)), 70.0 (d, $^1J_{CP}$=162.8 Hz, C—OH), 121.3 (s broad, C₁²), 122.4 (d, $^3J_{CP}$=3.8 Hz, C₀²), 129.4 (s, C₀³), 129.8 (d, $^3J_{CP}$=5.6 Hz, C₁³), 133.6 (s, C₀⁴), 136.4 (s, C₁⁴), 141.4 (d, $^3J_{CP}$=14.5 Hz, CH=N), 150.3 (dd, $^5J_{CP}$=3.4 Hz, $^2J_{CP}$=6.6 Hz, C₁¹), 151.4 (d, $^2J_{CP}$=8.0 Hz, C₀¹) ppm.

Example 2

Synthesis of the First Generation Dendritic Polymer (Core P₃N₃) Having α-hydroxy dimethylphosphonate Ends 1 g of Gc'₁ (0.35 mmol) is dissolved in 1 ml of THF, and then distilled triethylamine (10 µl, i.e. 0.84.10⁻³ mol) and dimethyl phosphite (382 µl, i.e. 4.2.10⁻³ mol) (1 equivalent per —CHO) are added. The mixture is stirred for 12 hours. The resulting paste is then washed with a THF/Et₂O mixture: 1/1 to give a white powder. The final product is isolated in a final yield of 72%.

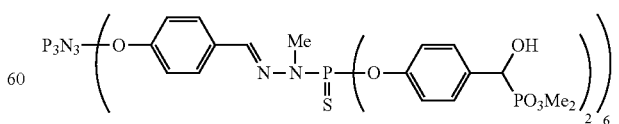

$^{31}P\text{-}\{^1H\}$ NMR (DMSO d6): δ=11.46 (s, P₀), 27.10 (s, P(O)(O—CH₃)₂), 66.07 (s, P₁) ppm.

$^1H$ NMR (DMSO d6): δ=3.35 (d, $^3J_{HP}$=10.5 Hz, 18H, CH₃—N—P₁), 3.54 (d, $^3J_{HP}$=10.3 Hz, 36H, P(O)—O—

CH$_3$), 3.59 (d, $^3J_{HP}$=10.4 Hz, 36H, P(O)—O—CH$_3$), 5.01 (dd, $^3J_{HH}$=5.2 Hz, $^2J_{HP}$=13.5 Hz, 12H, CH—P(O)), 6.41 (dd, $^3J_{HH}$=5.6 Hz, $^3J_{HP}$=15.5 Hz, 12H, OH), 7.18-7.93 (m, 78H, H$_{arom}$, CH=N) ppm.

$^{13}$C-{$^1$H} NMR (DMSO d6) δ=32.8 (d, $^2J_{CP}$=11.9 Hz, CH$_3$—N—P$_1$), 52.7 (d, $^2J_{CP}$=6.9 Hz, CH$_3$—O—P(O)), 53.2 (d, $^2J_{CP}$=6.9 Hz, CH$_3$—O—P(O)), 68.2 (d, $^1J_{CP}$=162.3 Hz, C—OH), 120.4 (s broad, C$_1^2$), 120.8 (s, C$_0^2$), 128.2 (s, C$_0^3$), 128.7 (d, $^3J_{CP}$=5.7 Hz, C$_1^3$), 132.0 (s, C$_0^4$), 135.5 (s, C$_1^4$), 140.2 (d, $^3J_{CP}$=13.8 Hz, CH=N), 149.4 (d, $^2J_{CP}$=6.3 Hz, C$_1^1$), 150.5 (s, C$_0^1$) ppm.

IR: Absence of μ(CHO) at 1670 cm$^{-1}$; μ(OH) at 3271 cm$^{-1}$.

Example 3

Synthesis of the Second Generation Dendritic Polymer Having α-Hydroxy Dimethylphosphonate Ends The dendritic polymer Gc'$_2$ (0.146 mmol, 1 g) is dissolved in 1 ml of THF with distilled triethylamine (1.3 mmol, 15 μl) and dimethyl phosphite (3.5 mmol, 319 μl). The mixture is stirred magnetically for 12 hours. The resulting paste is then washed with a THF/Et$_2$O mixture: 1/1 to give a white powder. The final product is isolated in a final yield of 80%.

CH$_3$), 5.00 (dd, $^3J_{HH}$=5.4 Hz, $^2J_{HP}$=15.7 Hz, 24H, CH—P(O)), 6.30 (dd, $^3J_{HH}$=5.4 Hz, $^2J_{HP}$=15.7 Hz, 24H, OH), 7.0-8.0 (m, 186H, H$_{arom}$, CH=N) ppm.

$^{13}$C-{$^1$H} NMR (DMSO d6): δ=32.8 (d broad, $^2J_{CP}$=11.3 Hz, CH$_3$—N—P$_{1,2}$), 52.7 (d, $^2J_{CP}$=6.2 Hz, CH$_3$—O—P(O)), 53.2 (d, $^2J_{CP}$=6.3 Hz, CH$_3$—O—P(O)), 68.2 (d, $^1J_{CP}$=163.0 Hz, C—OH), 120.4 (s broad, C$_2^2$), 120.8 (s broad, C$_0^2$), 121.4 (s, C$_1^2$), 128.2 (s, C$_0^3$), 128.2 (s, C$_1^3$), 128.7 (d, $^3J_{CP}$=3.7 Hz, C$_2^3$), 132.1 (s, C$_0^4$), 132.1 (s, C$_{14}$), 135.4 (s, C$_2^4$), 140.2 (s broad, CH=N—N(Me)-P$_{1,2}$), 149.4 (d, $^2J_{CP}$=3.8 Hz, C$_2^1$), 150.4 (s, C$_0^1$) 150.7 (d, $^2J_{CP}$=6.4 Hz, C$_1^1$) ppm.

IR: Absence of μ(CHO) at 1670 cm$^{-1}$; μ(OH) at 3271 cm$^{-1}$.

Example 4

Synthesis of the Third Generation Dendritic Polymer Having α-Hydroxy Dimethylphosphonate Ends The dendritic polymer Gc'$_3$ (1.35.10$^{-2}$ mmol, 0.2 g) is dissolved in 0.2 ml of THF with distilled triethylamine (0.8 mmol, 10 μl) and dimethyl phosphite (0.648 mmol, 59 μl). The mixture is stirred magnetically for 12 hours. The resulting paste is then washed with a THF/Et$_2$O mixture: 1/1 to give a white powder. The final product is isolated in a final yield of 85%.

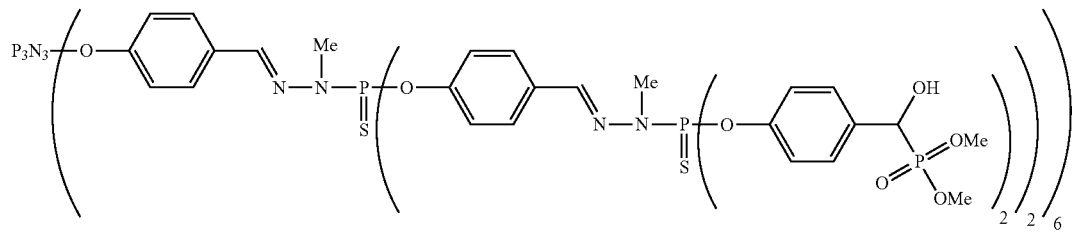

$^{31}$P-{$^1$H} NMR (DMSO d6): δ=11.7 (s, P$_0$), 27.10 (s, P(O)(O—CH$_3$)$_2$), 66.1 (s broad, P$_{1,2}$) ppm.

$^1$H NMR (DMSO d6): δ=3.29 (d broad, $^3J_{HP}$=9.2 Hz, 54H, CH$_3$—N—P$_1$, CH$_3$—N—P$_2$), 3.49 (d, $^2J_{CP}$=10.9 Hz, 72H, P(O)—O—CH$_3$), 3.55 (d, $^2J_{CP}$=10.6 Hz, 72H, P(O)—O—

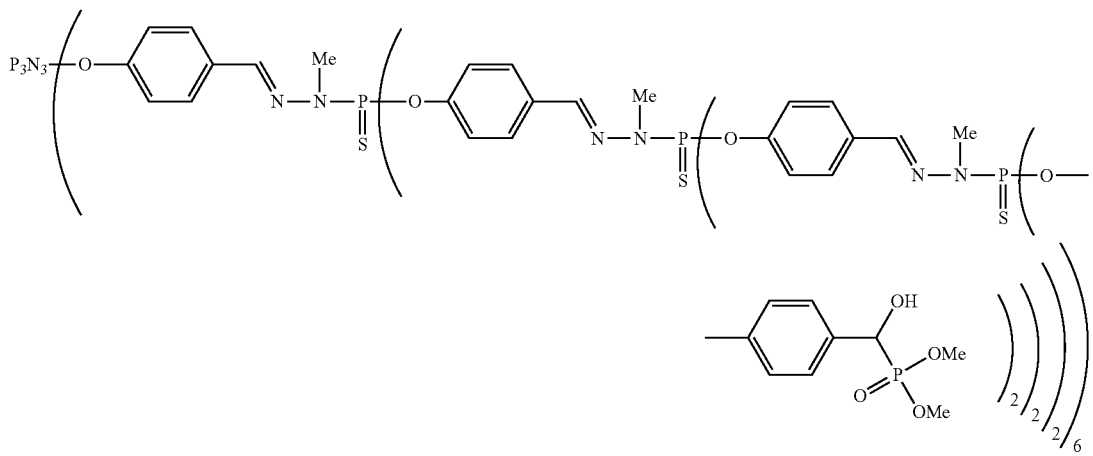

$^{31}$P-{$^1$H} NMR (DMSO d6): δ=11.7 (s, P$_0$), 28.6 (s, P(O)(O—CH$_3$)$_2$), 66.4 (s broad, P$_{1,2,3}$) ppm.

$^1$H NMR (DMSO d6): δ=3.40 (d broad, $^3$J$_{HP}$=10.7 Hz, 126H, CH$_3$—N—P$_1$, CH$_3$—N—P$_2$, CH$_3$—N—P$_3$), 3.60 (d, $^2$J$_{CP}$=13.15 Hz, 144H, P(O)—O—CH$_3$), 3.65 (d, $^2$J$_{CP}$=13.16 Hz, 144H, P(O)—O—CH$_3$), 5.10 (dd, $^3$J$_{HH}$=4.3 Hz, $^2$J$_{HP}$=15.3 Hz, 48H, CH—P(O)), 6.4 (dd, $^3$J$_{HH}$=4.3 Hz, $^2$J$_{HP}$=15.3 Hz, 48H, OH), 7.0-8.1 (m, 402H, H$_{arom}$, CH=N) ppm.

$^{13}$C-{$^1$H} NMR (DMSO d6): δ=32.8 (s broad, CH$_3$—N—P$_{1,2,3}$), 52.7 (d, $^2$J$_{CP}$=6.3 Hz, CH$_3$—O—P(O)), 53.2 (d, $^2$J$_{CP}$=7.4 Hz, CH$_3$—O—P(O)), 68.1 (d, $^1$J$_{CP}$=162.8 Hz, C—OH), 119.5 (s, C$_1^2$), 120.4 (s broad, C$_3^2$, C$_0^2$), 121.4 (s, C$_2^2$), 128.3 (s broad, C$_0^3$, C$_1^3$, C$_2^3$), 128.6 (d, $^3$J$_{CP}$=4.2 Hz, C$_3^3$), 132.1 (s, C$_0^0$, C$_1^4$, C$_2^4$), 135.5 (s, C$_3^4$), 140.2 (s broad, CH=N—N(Me)-P$_{1,2,3}$), 149.4 (s, d, $^2$J$_{CP}$=8.3 Hz, C$_3^1$), 150.6 (s broad, C$_0^1$, C$_1^1$, C$_2^1$) ppm.

IR: Absence of p(CHO) at 1670 cm$^{-1}$; μ(OH) at 3271 cm$^{-1}$.

Example 5

Synthesis of the First Generation Dendritic Polymer Having α-Hydroxy-Phosphonic Acid Ends The first generation dendritic polymer (4.78.10$^{-2}$ mmol, 200 mg) having α-hydroxy dimethylphosphonate ends is suspended in acetonitrile (4 ml) and triethylamine (0.575 mmol, 20.5 μl) at 0° C. Trimethylsilane bromide (1.72 mmol, 229 μl) is then added slowly at 0° C., and the whole returns slowly to ambient temperature over a period of 6 hours. Anhydrous methanol (1 ml) is then added. After 2 hours' stirring, the reaction mixture is dried under reduced pressure. Then the powder is suspended in a minimal amount of water for 30 minutes with vigorous stirring. After filtration, the product is dried and then washed with copious amounts of ether. Preferably, in order to obtain a soluble dendritic polymer, the final dendritic polymer must not be totally desolvated. The final product is isolated in a final yield of 51%.

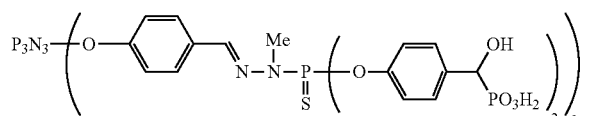

$^{31}$P-{$^1$H} NMR (DMSO d6): δ=11.40 (s, P$_0$), 22.0 (m, P(O)(OH)$_2$), 66.05 (s, P$_1$) ppm.

$^1$H NMR (DMSO d6): δ=3.29 (d, $^3$J$_{HP}$=10.5 Hz, 18H, CH$_3$—N—P$_1$), 4.67 (d, $^3$J$_{HP}$=13.9 Hz, 12H, —CH—OH), 4.7-5.7 (m, 36H, —OH), 7.0-8.0 (m, 78H, H$_{arom}$, CH=N) ppm.

$^{13}$C-{$^1$H} NMR (DMSO d6): δ=32.9 (d, $^2$J$_{CP}$=15.7 Hz, CH$_3$—N—P$_1$), 69.5 (d, $^1$J$_{CP}$=163.5 Hz, C—OH), 120.0 (s broad, C$_1^2$), 120.7 (s, C$_0^2$), 128.2 (s, C$_0^3$), 128.6 (s, C$_1^3$), 132.0 (s, C$_0^4$), 137.1 (s, C$_1^4$), 140.2 (s broad, CH=N), 148.8 (s, C$_1^1$), 150.4 (s, C$_0^1$) ppm.

IR: Absence of μ(CHO) at 1670 cm$^{-1}$; μ(OH) at 3271 cm$^{-1}$.

Example 6

Synthesis of the Second Generation Dendritic Polymer Having α-Hydroxy-Phosphonic Acid Ends The second generation dendritic polymer (3.16.10$^{-2}$ mmol, 300 mg) having α-hydroxy dimethylphosphonate ends is suspended in acetonitrile (1.5 ml) and triethylamine (0.86 mmol, 30 μl) at 0° C. Trimethylsilane bromide (2.3 mmol, 304 μl) is then added slowly at 0° C., and the whole returns slowly to ambient temperature over a period of 6 hours. Anhydrous methanol (1 ml) is then added. After 2 hours' stirring, the reaction mixture is dried under reduced pressure. Then the powder is suspended in a minimal amount of water for 30 minutes with vigorous stirring. After filtration, the product is dried and then washed with copious amounts of ether. Preferably, if a soluble product is desired, the final dendritic polymer must not be totally desolvated. The final product is isolated in a final yield of 62%.

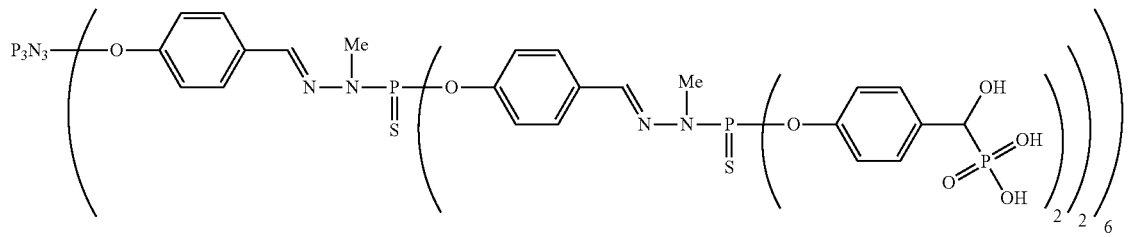

$^{31}$P-{$^1$H} NMR (DMSO d6): δ=11.9 (s, P$_0$), 21.5 (m, P(O)(OH)$_2$), 66.00 (s broad, P$_{1,2}$) ppm.

$^1$H NMR (DMSO d6): δ=3.06 (s broad, 54H, CH$_3$—N—P$_{1,2}$), 4.66 (d, $^3$J$_{HP}$=14.0 Hz, 24H, —CH—OH), 3.7-5.2 (m, 72H, —OH), 6.7-8.0 (m, 186H, H$_{arom}$, CH=N) ppm.

$^{13}$C-{$^1$H} NMR (DMSO d6): δ=33.6 (s broad, CH$_3$—N—P$_{1,2}$), 70.2 (d, $^1$J$_{CP}$=158.5 Hz, C—OH), 121.0 (s broad, C$_2^2$, C$_0^2$), 122.0 (s, C$_1^2$), 129.5 (s broad, C$_0^3$, C$_1^3$, C$_2^3$), 132.8 (s, C$_0^4$, C$_1^4$), 137.4 (s, C$_2^4$), 141.0 (s broad, CH=N), 149.8 (s broad, C$_2^1$), 151.2 (s broad, C$_0^1$, C$_1^1$) ppm.

IR: Absence of μ(CHO) at 1670 cm$^{-1}$; μ(OH) at 3271 cm$^{-1}$.

The derivatives having phosphonic acid terminations can be obtained by application or adaptation of this method starting from the compounds of Examples 1 to 5 and 8 to 10 having a dimethylphosphonate group. This reaction is not possible starting from the compound having a diisopropylphosphonate group of Example 7.

Example 7

Synthesis of the First Generation Dendritic Polymer Having Vinyl Diisopropyl-Phosphonate Terminations

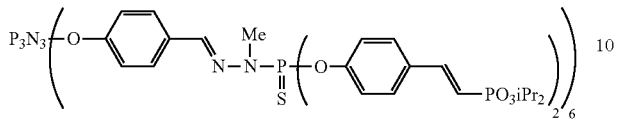

Tetraisopropyl-methylene gem-diphosphonate (3 mmol) and sodium hydride (3 mmol, 75 mg) are dissolved in 2 ml of distilled THF. The solution is stirred vigorously for 2 hours at ambient temperature. When the evolution of hydrogen has ceased, the solution is added slowly to the dendritic polymer $Gc'_1$ (0.17 mmol, 500 mg), which has previously been dissolved in 3 ml of distilled THF. The addition is carried out at 0° C., and then the mixture is allowed to return to ambient temperature overnight. The white solid is then washed with a pentane/ether mixture 1/1 in order to remove the excess tetraisopropyl-methylene gem-diphosphonate. The dendritic polymer is then suspended in a minimal amount of water, and the resulting cloudy solution is centrifuged. A white powder is recovered after centrifugation, but it may sometimes be necessary to repeat the operation (centrifugation) a second time, still with a minimal amount of water. The final product is isolated in a final yield of 55%. $^{31}P-\{^1H\}$ NMR (CDCl$_3$): δ=11.66 (s, $P_0$); 65.73 (s, $P_1$); 20.31 (s, P=O) ppm.

$^1$H NMR (CDCl$_3$): δ=1.26 (d, $^3J_{HH}$=6.2 Hz, 72H, CH$_3$—CH); 1.32 (d, $^3J_{HH}$=6.2 Hz, 72H CH$_3$—CH); 3.27 (d, $^3\overline{J_{HP}}$=10.4 Hz, 18H, N-Me); 4.66 (hept, $^3J_{HH}$=5.9 Hz, 24H, O—CH—(CH$_3$)$_2$); 6.14 (dd, $^3J_{HH\ trans}$=$^2J_{HP(O)}$=17.1 Hz, 12H, —CH=CH—P(O)); 6.9-7.7 (m, 90H, $\underline{CH}_{arom}$, CH=N, —CH=CH—$\overline{P(O)}$) ppm.

$^{13}C-\{^1H\}$ NMR (CDCl$_3$): δ=24.0 (d, $^3J_{CP}$=5.0 Hz, CH$_3$—CH); 32.9 (d, $^2J_{CP}$=12 Hz, CH$_3$—N—P$_1$); 70.5 (d, $^2\overline{J_{CP}}$=5.0 Hz, —O—CH—CH$_3$); 116.1 (d, $^1J_{CP}$=192.52 Hz, —CH=CH—P(O)($\overline{OiPr}$)$_2$); 121.4 (s broad, $C_0^2$); 121.8 (d, $^3J_{CP}$=4.9 Hz, $C_1^2$); 128.3 (s, $C_0^3$); 129.0 (s, $C_1^3$); 132.2 (d, $^3J_{CP}$=18.7 Hz, $C_1^4$); 132.7 (s, $C_0^4$); 139.0 (d, $^3J_{CP}$=14.46 Hz, CH=N); 146.3 (d, $^2J_{CP}$=6.3 Hz, —CH=CH—P(O)(OiPr)$_2$); 151.3 (s broad, $C_0^1$); 151.6 (d, $^2\overline{J_{CP}}$=5.7 Hz, $C_1^1$); ppm.

Example 8

Synthesis of the First Generation Dendritic Polymer Having Vinyl Dimethyl-Phosphonate Terminations Tetramethyl-methylene gem-diphosphonate (11.7 mmol, 2.7 g) and sodium hydride (11.7 mmol, 281 mg) are dissolved in 10 ml of distilled THF. The solution is stirred vigorously for 2 hours at ambient temperature. When the evolution of hydrogen has ceased, the solution is added slowly to the dendritic polymer $Gc'_2$ (0.7 mmol, 1 g), which has previously been dissolved in 5 ml of distilled THF. The addition is carried out at 0° C., and then the mixture is allowed to return to ambient temperature overnight. The white solid is then washed with a pentane/ether mixture 1/1 in order to remove the excess tetramethyl-methylene gem-diphosphonate. The dendritic polymer is then suspended in a minimal amount of water, and the resulting cloudy solution is centrifuged. A white powder is recovered after centrifugation, but it may sometimes be necessary to repeat the operation (centrifugation) a second time, still with a minimal amount of water. The final product is isolated in a final yield of 63%.

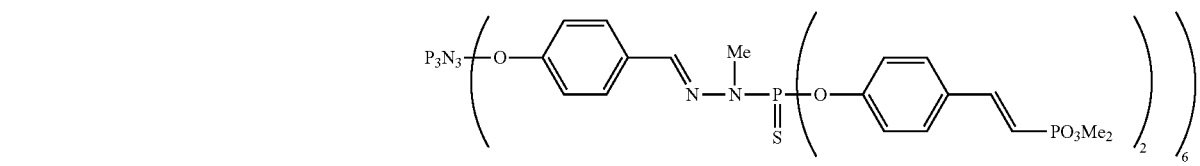

$^{31}P-\{^1H\}$ NMR (CDCl$_3$): δ=11.7 (s, $P_0$); 65.5 (s, $P_1$); 25.43 (s, P=O) ppm.

$^1$H NMR (CDCl$_3$): δ=3.27 (d, $^3J_{HP}$=9.5 Hz, 18H, N-Me); 3.72 (d, $^3J_{HP}$=10.6 Hz, 72H, O—CH$_3$); 6.08 (dd, $^3J_{HH\ trans}$=$^2J_{HP(O)}$=16.9 Hz, 12H, —CH=CH—P(O)); 6.9-7.8 (m, 90H, $CH_{arom}$, CH=N, —CH=CH=P(O)) ppm.

$^{13}C-\{^1H\}$ NMR (CDCl$_3$): δ=32.9 (d, $^2J_{CP}$=12.13 Hz, CH$_3$—N—P$_1$); 52.4 (d, $^2J_{CP}$=5.6 Hz, —O—CH$_3$); 112.7 (d, $^1J_{CP}$=191.64 Hz, —CH=CH—P(O)($\overline{OMe)_2}$); 121.3 (s broad, $C_0^2$); 121.7 (d, $^3J_{CP}$=3.2 Hz, $C_1^2$); 128.2 (s, $C_0^3$); 129.1 (s, $C_1^3$); 131.9 (s, $C_0^4$); 132.1 (d, $^3J_{CP}$=16.9 Hz, $C_1^4$); 139.0 (d, $^3J_{CP}$=13.4 Hz, CH=N); 148.03 (d, $^2J_{CP}$=6.8 Hz, —CH=CH—P(O)(OMe)$_2$); 151.2 (s broad, $C_0^1$); 151.8 (d, $^2\overline{J_{CP}}$=6.3 Hz, $C_1^1$) ppm.

Example 9

Synthesis of the Second Generation Dendritic Polymer Having Vinyl Dimethyl-Phosphonate Terminations Tetramethyl-methylene gem-diphosphonate (0.77 mmol, 0.18 g) and sodium hydride (0.78 mmol, 19 mg) are dissolved in 4 ml of distilled THF. The solution is stirred vigorously for 2 hours at ambient temperature. When the evolution of hydrogen has ceased, the solution is added slowly to the dendritic polymer $Gc'_2$ (2.9.10$^{-2}$ mmol, 0.2 mg), which has previously been dissolved in 2 ml of distilled THF. The addition is carried out at 0° C., and then the mixture is allowed to return to ambient temperature overnight. The white solid is then washed with a pentane/ether mixture 1/1 in order to remove the excess tetramethyl-methylene gem-diphosphonate. The dendritic polymer is then suspended in a minimal amount of water, and the resulting cloudy solution is centrifuged. A white powder is recovered after centrifugation, but it may sometimes be necessary to repeat the operation (centrifugation) a second time, still with a minimal amount of water. The final product is isolated in a final yield of 68%.

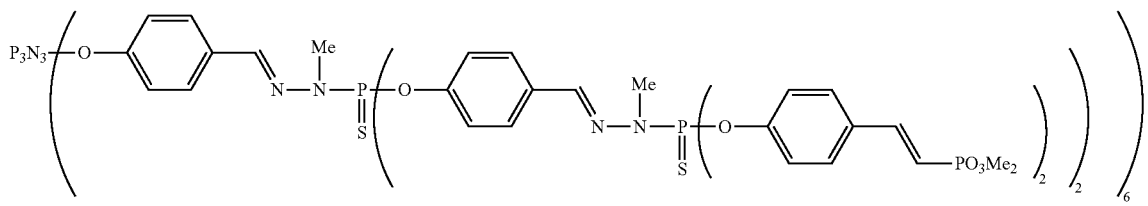

$^{31}$P-{$^{1}$H} NMR (CDCl$_3$): δ=11.8 (s, P$_0$); 65.4 (s, P$_2$); 65.9 (s, P$_1$); 25.4 (s, P=O) ppm.

$^{1}$H NMR (CDCl$_3$): δ=3.26 (d broad, $^{3}J_{HP}$=10.2 Hz, 54H, N-Me); 3.66 (d, $^{3}J_{HP}$=10.4 Hz, 144H, O—CH$_3$); 6.06 (dd, $^{3}J_{HH\ trans}$=$^{2}J_{HP(O)}$=16.9 Hz, 24H, —CH=CH—P(O)); 6.9-7.8 (m, 210H, CH$_{arom}$, CH=N, —CH=CH—P(O)) ppm.

$^{13}$C-{$^{1}$H} NMR (CDCl$_3$): δ=33.0 (d, $^{2}J_{CP}$=12.5 Hz, CH$_3$—N—P$_{1,2}$); 52.5 (d, $^{2}J_{CP}$=5.3 Hz, —O—CH$_3$); 112.6 (d, $^{1}J_{CP}$=192.08 Hz, —CH=CH—P(O)(OMe)$_2$); 121.4 (s broad, C$_0^2$); 121.9 (s broad, $\overline{C_1^2}$, C$_2^2$); 128.4 (s broad, C$_0^3$, C$_1^3$); 129.2 (s, C$_2^3$); 132.0 (s, C$_1^4$); 132.4 (s broad, C$_0^4$, C$_2^4$); 139.2 (d, $^{3}J_{CP}$=13.6 Hz, CH=N); 148.1 (d, $^{2}J_{CP}$=5.4 Hz, —CH=CH—P(O)(OMe)$_2$); 151.2 (s, C$_0^1$); 151.3 (d, $^{2}J_{CP}$=6.9 $\overline{Hz}$, C$_1^1$); 151.8 (d, $^{2}J_{CP}$=6.4 Hz, C$_2^1$) ppm.

Example 10

Synthesis of the Third Generation Dendritic Polymer Having Vinyl Dimethyl-Phosphonate Terminations Tetramethyl-methylene gem-diphosphonate (0.71 mmol, 165 mg) and sodium hydride (0.71 mmol, 17.1 mg) are dissolved in 5 ml of distilled THF. The solution is stirred vigorously for 2 hours at ambient temperature. When the evolution of hydrogen has ceased, the solution is added slowly to the dendritic polymer Gc'$_3$ (1.35.10$^{-2}$ mmol, 200 mg), which has previously been dissolved in 3 ml of distilled THF. The addition is carried out at 0° C., and then the mixture is allowed to return to ambient temperature overnight. The white solid is then washed with a pentane/ether mixture 1/1 in order to remove the excess tetramethyl-methylene gem-diphosphonate. The dendritic polymer is then suspended in a minimal amount of water, and the resulting cloudy solution is centrifuged. A white powder is recovered after centrifugation, but it may sometimes be necessary to repeat the operation (centrifugation) a second time, still with a minimal amount of water. The final product is isolated in a final yield of 72%.

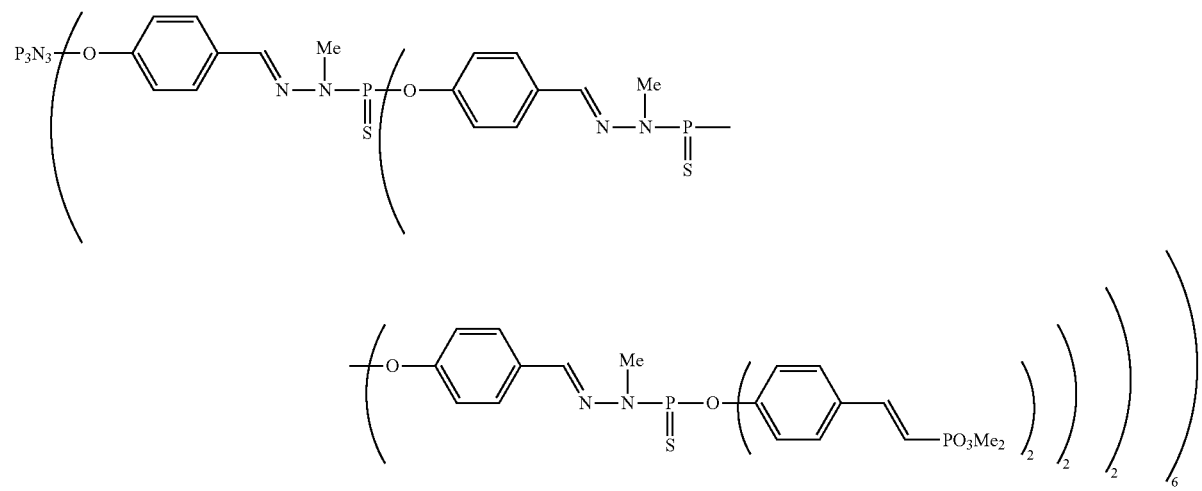

$^{31}$P-{$^{1}$H} NMR (CDCl$_3$): δ=11.7 (s, P$_0$); 65.3 (s, P$_3$); 66.0 (s, P$_{1,2}$); 25.5 (s, P=O) ppm.

$^{1}$H NMR (CDCl$_3$): δ=3.29 (s broad, 126H, N-Me); 3.68 (d, $^{3}J_{HP}$=7.7 Hz, 288H, O—CH$_3$); 6.08 (dd, $^{3}J_{HH\ trans}$=$^{2}J_{HP(O)}$=17.6 Hz, 48H, —CH=CH—P(O)); 6.9-7.8 (m, 450H, CH$_{arom}$, CH=N, —CH=CH—P(O)) ppm.

$^{13}$C-{$^{1}$H} NMR (CDCl$_3$): δ=33.0 (d, $^{2}J_{CP}$=13.1 Hz, CH$_3$—N—P$_{1,2,3}$); 52.5 (d, $^{2}J_{CP}$=5.5 Hz, —O—CH$_3$); 112.6 (d, $^{1}J_{CP}$=192.2 Hz, —CH=CH—P(O)(OMe)$_2$); 121.9 (d broad, $^{3}J_{CP}$=2.7 Hz, C$_0^2$, C$_1^2$, $\overline{C_2^2}$, C$_3^2$); 128.3 (s broad, C$_0^3$, C$_1^3$, C$_2^3$); 129.1 (s, C$_3^3$); 131.9 (s broad, C$_0^4$, C$_2^4$); 132.1 (s, C$_1^4$); 132.2 (s, C$_3^4$); 139.2 (d, $^{3}J_{CP}$=13.2 Hz, CH=N); 148.3 (s broad, —CH=CH—P(O)(OMe)$_2$); 151.3 (s, C$_1^1$, C$_0^1$); 151.8 (s, C$_3^1$); 152.0 (s, C$_2^1$) ppm.

Example 11

Synthesis of 4-hydroxybenzyl Dimethyl-Phosphonate

Steps a) to d) of this multi-step synthesis have already been described by J. D. Olsjewski et al. *J. Org. Chem.* 1994, 59, 4285-4296.

a) Synthesis of 4-tert-butyldimethylsilyl-benzaldehyde

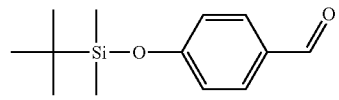

4-Hydroxy-benzaldehyde (10 g, 0.082 mol) is dissolved in 100 ml of dichloromethane. There are added to that solution, at ambient temperature, chlorotrimethylsilane (11.72 g, 0.078 mol) as well as dimethylaminopyridine (1 g, 0.008 mol) and triethylamine (23 ml, 0.164 mol). The whole is left at ambient temperature for 48 hours with magnetic stirring, and then the solvent is evaporated off under reduced pressure. The resulting solid is stirred in pure pentane (3×200 ml), and the silylated product is extracted in that manner.

b) Synthesis of 4-tert-butyldimethylsilyl-benzaldehyde

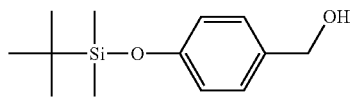

4-Tert-butyldimethylsilyl-benzaldehyde (28 g, 0.118 mol) is dissolved in a THF/ethanol mixture (50 ml/10 ml). Sodium borohydride (9 g, 0.237 mol) is added to that solution at ambient temperature, and the suspension is stirred under argon and at ambient temperature for 4 days. All the solvents are then evaporated off from the reaction mixture under reduced pressure, and a very compact white gel is thus obtained. The gel is suspended in ether, and then a saturated ammonium hydrochloride solution is added very slowly until a more homogeneous solution is obtained in both phases. When both phases are homogeneous, the final product is separated off by simple water/ether decantation. The ethereal phase is evaporated off and then the resulting product is taken up in pentane and washed once with water.

c) Synthesis of 4-tert-butyldimethylsilyl-benzaldehyde

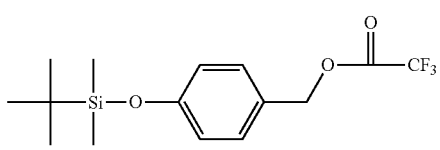

Benzyl alcohol (27 g, 0.113 mol) is dissolved in THF (100 ml); trifluoroacetic anhydride (19.2 ml, 0.136 mol) is added to that solution at ambient temperature. The whole is then heated at the reflux temperature of THF for one hour. The mixture is then allowed to return slowly to ambient temperature, and 75% of the THF is evaporated off; the whole is then taken up in ether and washed firstly with a sodium hydrogen carbonate solution (2×100 ml) and once with water (100 ml).

d) Synthesis of 4-tert-butyldimethylsilyl-benzaldehyde

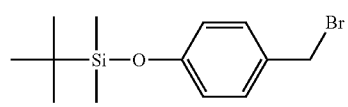

Trifluoroacetate (35 g, 0.105 mol) is dissolved in THF (100 ml); lithium bromide (11 g, 0.126 mol) is added to that solution, and the whole is heated at the reflux temperature of THF for 18 hours. The THF is evaporated off under reduced pressure, and then the product is taken up in 40 ml of acetonitrile and decantation is carried out with hexane (4×100 ml). The hexane is evaporated off and a whitish oil containing white crystals is obtained. It is then necessary to recover the oil using hexane again but filtering off the crystals. The product is isolated in a yield of 84%.

e) Synthesis of 4-tert-butyldimethylsilyl-benzyl dimethyl-phosphonate

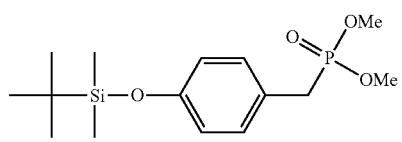

4-Tert-butyldimethylsiloxane benzyl bromide (2.72 mmol, 800 mg) is added to trimethyl phosphite (4 mmol, 0.47 ml). The trimethyl phosphite is added in several portions: the first equivalent (0.32 ml) is added first, and then the whole is heated to 80° C., with stirring and without solvent. The reaction liberates methyl bromide, which must be removed in order for the reaction to be complete. After heating at reflux for 4 hours, the excess trimethyl phosphite (0.15 ml) is added. The reaction mixture is again heated at 80° C. for 2 hours. The final mixture contains traces of dimethyl phosphite, which can be removed under reduced pressure at 80° C., as well as methyl-dimethyl phosphite, which is a by-product due to the formation of methyl bromide.

$^{31}$P-$\{^{1}$H$\}$ NMR (CDCl$_3$): δ=32.6 (s, P) ppm.

$^{1}$H NMR (CDCl$_3$): δ=0.17 (s, 6H, Si—CH$_3$); 0.97 (s, 9H, Si-tBu); 3.09 (d, $^{2}J_{HP}$=21.2 Hz, 2H, —CH$_2$—); 3.63 (d, $^{2}J_{HP}$=10.7 Hz, 6H, O-Me); 6.78 (d, $^{3}J_{HH}$=8.5 Hz, 2H, CH$_{arom}$); 7.15 (dd, $^{3}J_{HH}$=8.5 Hz, $^{4}J_{HP}$=2.5 Hz, 2H, CH$_{arom}$) ppm.

f) Synthesis of 4-hydroxybenzyl dimethyl-phosphonate

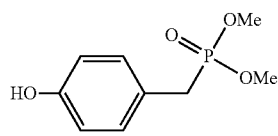

4-Hydroxybenzyl dimethyl-phosphonate (2.72 mmol) is dissolved in 5 ml of anhydrous THF, and then tetrabutylammonium fluoride in 1 M anhydrous solution in THF is added (5.4 mmol, 5.5 ml). The mixture is left at ambient temperature for 48 hours. Several drops of water are added to the reaction mixture after one hour's stirring the product is washed with pentane. The product is then purified by filtration over silica, first using a solvent:pure ether gradient and then using a pentane/THF mixture 1/1.

The final product is recrystallised from dichloromethane; to that end, it is dissolved in a minimal amount of hot dichloromethane and then allowed to return very slowly to ambient temperature and finally, at −20° C., the product is recovered in totally pure form, in the form of white crystals.

$^{31}P-\{^1H\}$ NMR (CDCl$_3$): δ=32.4 (s, P) ppm.

$^1H$ NMR (CDCl$_3$): δ=3.07 (d, $^2J_{HP}$=22.0 Hz, 2H, —CH$_2$—); 3.68 (d, $^2J_{HP}$=10.8 Hz, 6H, O-Me); 6.64 (dd, $^3J_{HH}$=8.6 Hz, $^5J_{HP}$=0.78 Hz, 2H, CH$_{arom}$); 7.04 (dd, $^3J_{HH}$=8.6 Hz, $^4J_{HP}$=2.8 Hz, 2H, CH$_{arom}$); 7.68 (s broad, 1H, OH) ppm.

$^{13}C-\{^1H\}$ NMR (CDCl$_3$): δ=31.7 (d, $^1J_{CP}$=139.6 Hz, —CH$_2$—P); 53.1 (d, $^2J_{CP}$=6.9 Hz, —OMe); 116.0 (s, C$_2$); 120.8 (d, $^2J_{CP}$=8.17 Hz, C$_4$); 130.7 (d, $^3J_{CP}$=7.54 Hz, C$_3$); 156.0 (d, $^5J_{CP}$=3.14 Hz, C$_1$) ppm.

Example 12

Synthesis of a First Generation Dendritic Polymer Having Benzyl Dimethyl-Phosphonate Ends

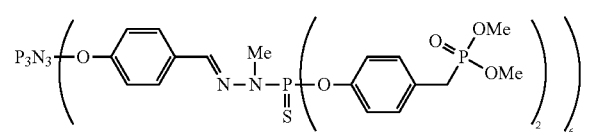

The first generation dendritic polymer having dichlorothiophosphine ends Gc$_1$ (0.109 mmol, 200 mg) is dissolved in THF (2 ml); cesium carbonate (2.6 mmol, 853 mg) is added to that solution. Finally, 4-hydroxy-benzyl dimethyl-phosphonate is added (1.3 mmol, 282 mg). The mixture is stirred for 24 hours at ambient temperature. The sample is then placed in vacuo until a white powder is obtained, which powder is washed with a pentane/ether mixture (1/1). The final product is isolated in a final yield of 73%.

$^{31}P-\{^1H\}$ NMR (CDCl$_3$): δ=66.2 (s, P$_1$); 31.9 (s, P(O)(OMe)$_2$); 12.3 (s, P$_0$) ppm.

$^1H$ NMR ((CD$_3$)$_2$CO): δ=3.15 (d, $^2J_{HP}$=21.5 Hz, 24H, CH$_2$); 3.32 (d, $^3J_{HP}$=10.5 Hz, 18H, CH$_3$—N—P$_1$); 3.58 (d, $^3J_{HP}$=10.9 Hz, 72H, P(O)—O—CH$_3$); 6.90-7.90 (m, 78H, H$_{arom}$, CH=N) ppm.

$^{13}C-\{^1H\}$ NMR ((CD$_3$)$_2$CO): δ=31.85 (d, $^1J_{CP}$=136.4 Hz, —CH$_2$—P(O)(OMe)$_2$); 33.4 (d, $^2J_{CP}$=16.8 Hz, CH$_3$—N—P$_1$); 52.8 (d, $^2J_{CP}$=6.8 Hz, —O—CH$_3$); 121.9 (s broad, C$_0^2$ and C$_1^2$); 129.1 (s, C$_0^3$); 130.3 (d, $^2J_{CP}$=8.6 Hz, C$_1^4$); 131.8 (d, $^2J_{CP}$=6.18 Hz, C$_1^3$); 133.3 (s, C$_0^4$); 140.4 (d, $^3J_{CP}$=14.04 Hz, CH=N); 150.3 (d broad, $^2J_{CP}$=3.8 Hz, C$_1^1$); 152.0 (d broad, C$_0^1$) ppm.

Example 13

Synthesis of a Second Generation Dendritic Polymer Having Benzyl Dimethyl-Phosphonate Ends The second generation dendritic polymer having dichlorothiophosphine ends Gc$_2$ (0.02 mmol, 100 mg) is dissolved in THF (2 ml). Cesium carbonate (1.5 mmol, 490 mg) is added to that solution. Finally, 4-hydroxy-benzyl dimethyl-phosphonate is added (0.53 mmol, 113 mg). The mixture is stirred for 24 hours at ambient temperature. The sample is then placed in vacuo until a white powder is obtained, which powder is washed with a pentane/ether mixture (1/1). The final product is isolated in a final yield of 78%.

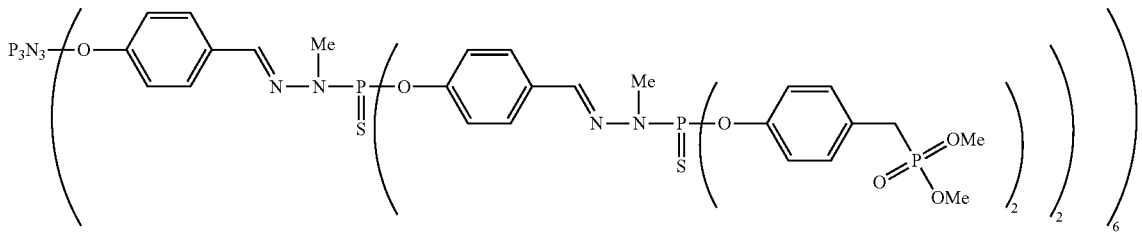

$^{31}P-\{^1H\}$ NMR (CDCl$_3$): δ=66.0 (s, P$_2$); 65.9 (s, P$_1$); 31.8 (s, P(O)(OMe)$_2$); 11.8 (s, P$_0$) ppm.

$^1H$ NMR ((CD$_3$)$_2$CO): δ=3.15 (d, $^2J_{HP}$=22.2 Hz, 48H, CH$_2$); 3.25 (d, 3J$_{HP}$=11.2 Hz, 54H, CH$_3$—N—P$_{1,2}$); 3.55 (d, $^3J_{HP}$=10.8 Hz, 144H, P(O)—O—CH$_3$); 6.70-7.90 (m, 186H, H$_{arom}$, CH=N) ppm.

$^{13}C-\{^1H\}$ NMR (CDCl$_3$): δ=32.1 (d, $^1J_{CP}$=138.6 Hz, —CH$_2$—P(O)(OMe)$_2$); 33.0 (d, $^2J_{CP}$=12.2 Hz, CH$_3$—N—P$_{\overline{1,2}}$); 52.9 (d, $^2J_{CP}$=6.3 Hz, —O—CH$_3$); 121.4 (s, C$_0^2$); 121.5 (s, C$_1^2$); 121.6 (d broad, $^3J_{CP}$=3.5 Hz, C$_2^2$); 128.3 (s, C$_0^3$, C$_1^3$); 128.4 (d, $^2J_{CP}$=8.9 Hz, C$_2^4$); 130.8 (d, $^2J_{CP}$=6.5 Hz, C$_2^3$); 132.1 (s, C$_0^4$); 132.3 (s, C$_1^4$); 138.6 (d, $^3J_{CP}$=13.7 Hz, $\overline{CH}$=N—N(Me)-P$_2$); 139.1 (d, $^3J_{CP}$=12.8 Hz, $\overline{CH}$=N—N(Me)-P$_1$); 149.6 (dd, $^2J_{CP}$=6.1 Hz, $^5J_{CP}$=3.8 Hz, $\overline{C_2^1}$); 151.1 (s, C$_0^1$); 151.2 (d, $^2J_{CP}$=7.6 Hz, C$_1^1$) ppm.

Example 14

Synthesis of a Third Generation Dendritic Polymer Having Benzyl Dimethyl-Phosphonate Ends The third generation dendritic polymer having dichlorothiophosphine ends Gc$_3$ (0.014 mmol, 150 mg) is dissolved in THF (2 ml). Cesium carbonate (1.4 mmol, 460 mg) is added to that solution. Finally, 4-hydroxy-benzyl dimethyl-phosphonate is added (0.71 mmol, 153 mg). The mixture is stirred for 24 hours at ambient temperature. The sample is then placed in vacuo until a white powder is obtained, which powder is washed with a pentane/ether mixture (1/1). The final product is isolated in a final yield of 80%.

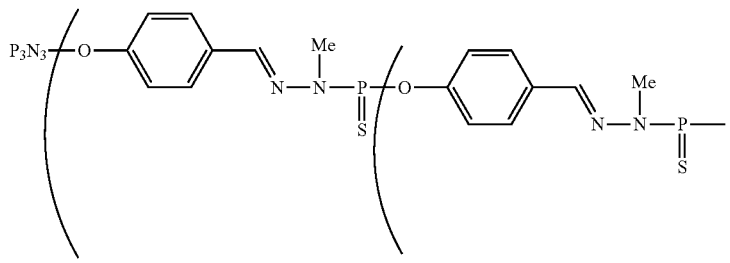

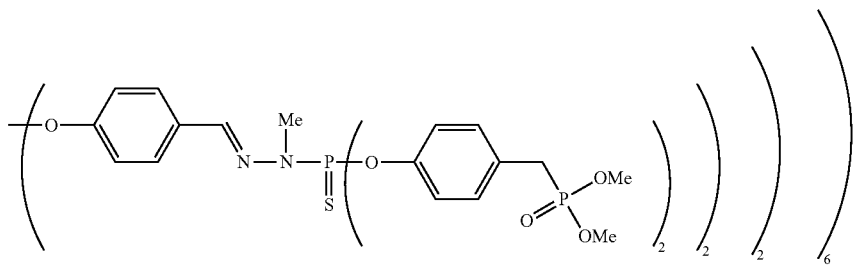

$^{31}$P-{$^{1}$H} NMR (CDCl$_3$): δ=66.0 (s, P$_{1,2,3}$); 31.9 (s, P(O)(OMe)$_2$); 11.5 (s, P$_0$) ppm.

$^{1}$H NMR (CDCl$_3$): δ=3.03 (d, $^{2}J_{HP}$=21.5 Hz, 96H, CH$_2$); 3.23 (d, $^{3}J_{HP}$=9.7 Hz, 126H, CH$_3$—N—P$_{1,2,3}$); 3.54 (d, $^{3}J_{HP}$=10.8 Hz, 288H, P(O)—O—CH$_3$); 6.70-7.90 (m, 402H, H$_{arom}$, CH=N) ppm.

$^{13}$C-{$^{1}$H} NMR (CDCl$_3$): δ=31.8 (d, $^{1}J_{CP}$=122.5 Hz, -CH$_2$—P(O)(OMe)$_2$); 33.1 (s, CH$_3$—N—P$_{1,2,3}$); 52.9 (d, $^{2}J_{CP}$=7.4 Hz, —O—CH$_3$); 121.2 (s, C$_1^2$); 121.5 (s, C$_3^2$); 121.7 (s broad, C$_2^2$, C$_0^2$); 128.3 (s, C$_0^3$, C$_1^3$, C$_2^3$); 128.4 (d, $^{2}J_{CP}$=10.1 Hz, C$_3^4$); 130.5 (s, C$_0^4$); 130.6 (s, C$_1^4$); 130.8 (d, $^{2}J_{CP}$=6.2 Hz, C$_3^3$) 132.2 (s, C$_2^4$); 138.7 (d broad, $^{3}J_{CP}$=13.6 Hz, CH=N—N(Me)-P$_{1,2,3}$); 148.3 (s broad, C$_0^1$); 149.6 (dd, $^{2}J_{CP}$=4.3 Hz, $^{5}J_{CP}$=4.3 Hz, C$_3^1$); 151.2 (d, $^{2}J_{CP}$=7.1 Hz, C$_1^1$, C$_2^1$) ppm.

$^{31}$P-{$^{1}$H} NMR (DMSO d$^6$): δ=66.1 (s, P$_1$); 25.2 (s, P(O)(OH)$_2$); 11.7 (s, P$_0$) ppm.

$^{1}$H NMR (DMSO d$^6$): δ=2.89 (d, 2J$_{HP}$=20.7 Hz, 24H, CH$_2$); 3.22 (d, $^{3}J_{HP}$=10.6 Hz, 18H, CH$_3$—N—P$_1$); 4.0-5.2 (m, 24H, —PO$_3$H$_2$); 6.70-7.90 (m, 78H, H$_{arom}$, CH=N) ppm.

$^{13}$C-{$^{1}$H} NMR (DMSO d$^6$): δ=32.8 (d, $^{2}J_{CP}$=11.3 Hz, CH$_3$—N—P); 34.3 (d, $^{1}J_{CP}$=132.7 Hz, —CH$_2$— P(O)(OH)$_2$); 120.4 (s, C$_1^2$); 120.9 (s, C$_0^2$); 128.2 (s, C$_0^3$); 130.9 (d, C$_1^3$, $^{2}J_{CP}$=6.8 Hz); 131.1 (s, C$_1^4$); 132.1 (s, C$_0^4$); 139.8 (d broad, $^{3}J_{CP}$=10.8 Hz, CH=N); 148.3 (d, $^{2}J_{CP}$=7.2 Hz, C$_1^1$); 150.4 (s, C$_0^1$) ppm.

Example 15

Synthesis of a First Generation Dendritic Polymer Having Benzyl-Phosphonic Ends The first generation dendritic polymer having benzyl dimethyl-phosphonate ends (400 mg, 0.1 mmol) is dissolved in acetonitrile (1 ml). The mixture is cooled to 0° C., and then bromotrimethylsilane (386 μl, 2.9 mmol), i.e. 1.2 equivalents of silane per methyl end, is added slowly. The mixture is left at ambient temperature for 16 hours. The sample is then placed in vacuo for two hours. A powder is obtained, and then anhydrous methanol (1 ml) is added; the suspension is stirred for 2 hours and finally the product is placed in vacuo again for one hour. The resulting powder is washed several times with water and with ether. The final product is isolated in a yield of 70%.

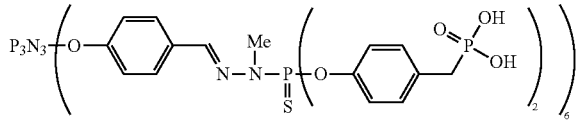

Example 16

Synthesis of a Second Generation Dendritic Polymer Having Benzyl-Phosphonic Ends The second generation dendritic polymer having benzyl dimethyl-phosphonate ends (130 mg, 0.014 mmol) is dissolved in acetonitrile (1 ml). The mixture is cooled to 0° C., and then bromotrimethylsilane (101 μl, 0.76 mmol), i.e. 1.2 equivalents of silane per methyl end, is added slowly. The mixture is left at ambient temperature for 16 hours. The sample is then placed in vacuo for two hours. A powder is obtained, and then anhydrous methanol (1 ml) is added; the suspension is stirred for 2 hours and finally the product is placed in vacuo again for one hour. The resulting powder is washed several times with water and with ether. The final product is isolated in a yield of 63%.

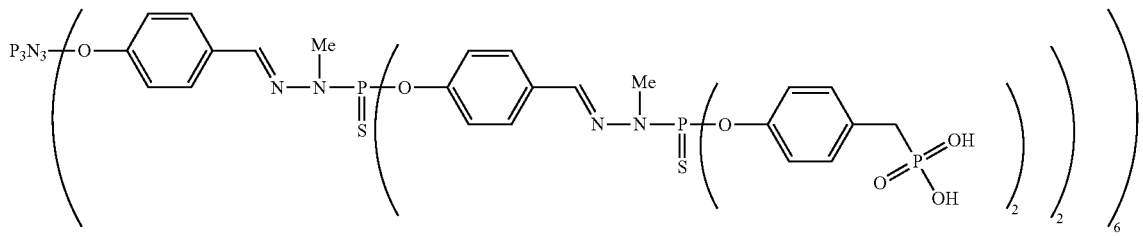

$^{31}$P-{$^1$H} NMR (DMSO d6/D$_2$O): δ=66.1 (s, P$_{1,2}$); 25.5 (s, P(O)(OH)$_2$); 11.9 (s, P$_0$) ppm.

$^1$H NMR (DMSO d6/D$_2$O): δ=2.95 (s broad, 48H, CH$_2$); 3.40-3.75 (m, 54H, CH$_3$—N—P$_{1,2}$); 6.50-7.30 (m, 186H, H$_{arom}$, CH=N) ppm.

$^{13}$C-{$^1$H} NMR (DMSO d6/D$_2$O): δ=32.9 (d, $^2$J$_{CP}$=11.5 Hz, CH$_3$—N—P$_{1,2}$); 34.5 (d, $^1$J$_{CP}$=133.7 Hz, —CH$_2$—P(O)(OH)$_2$); 119.5 (s, C$_0^2$); 120.4 (s, C$_2^2$); 121.4 (s, C$_1^2$); 128.2 (s, C$_0^3$, C$_1^3$); 131.0 (s broad, C$_2^4$, C$_2^3$); 132.1 (s, C$_0^4$, C$_1^4$); 140.3 (d broad, $^3$J$_{CP}$=11.1 Hz, CH=N); 148.3 (d, $^2$J$_{CP}$=3.6 Hz, C$_2^1$); 150.3 (s, C$_0^1$); 150.7 (s, $^2$J$_{CP}$=6.0 Hz, C$_1^1$) ppm.

Example 17

Synthesis of a Third Generation Dendritic Polymer Having Benzyl-Phosphonic Ends The third generation dendritic polymer having benzyl dimethyl-phosphonate ends (200 mg, 0.01 mmol) is dissolved in acetonitrile (1 ml). The mixture is cooled to 0° C., and then bromotrimethylsilane (146 μl, 1.09 mmol), i.e. 1.1 equivalents of silane per methyl end, is added slowly. The mixture is left at ambient temperature for 16 hours. The sample is then placed in vacuo for two hours. A powder is obtained, and then anhydrous methanol (1 ml) is added; the suspension is stirred for 2 hours and finally the product is placed in vacuo again for one hour. The resulting powder is washed several times with water and with ether. The final product is isolated in a yield of 81%.

$^{31}$P-{$^1$H} NMR (DMSO d6): δ=66.1 (s, P$_{1,2,3}$); 25.1 (s, P(O)(OH)$_2$); 11.7 (s, P$_0$) ppm.

$^1$H NMR (DMSO d6): δ=2.94 (d, $^2$J$_{HP}$=23.1 Hz, 96H, CH$_2$); 3.10-3.40 (m, 126H, CH$_3$—N—P$_{1,2,3}$); 5.2-6.2 (m, 96H, —PO$_3$H$_2$); 7.00-8.10 (m, 402H, H$_{arom}$, CH=N) ppm.

$^{13}$C-{$^1$H} NMR (DMSO d6): δ=32.9 (d, $^2$J$_{CP}$=12.2 Hz, CH$_3$—N—P$_{1,2,3}$); 34.5 (d, $^1$J$_{CP}$=132.1 Hz, —CH$_2$—P(O)(OH)$_2$); 119.5 (s, C$_0^2$); 120.4 (s, C$_3^2$); 120.6 (s, C$_2^2$); 121.4 (s, C$_1^2$); 128.3 (s, C$_0^3$, C$_1^3$, C$_2^3$); 131.0 (s broad, C$_3^4$, C$_3^3$); 132.1 (s broad, C$_0^4$, C$_1^4$, C$_2^4$); 140.3 (d broad, $^3$J$_{CP}$=10.4 Hz, CH=N); 148.3 (d, $^2$J$_{CP}$=6.2 Hz, C$_3^1$); 150.6 (d broad, $^2$J$_{CP}$=7.2 Hz, C$_0^1$, C$_1^1$, C$_2^1$) ppm.

Example 18

Synthesis of the Generation Zero Dendritic Polymer (Core P$_3$N$_3$) Having α-hydroxy Dimethylphosphonate Ends Distilled triethylamine (5 μl, i.e. 0.42.10$^{-3}$ mol) and dimethyl phosphite (196 μl, i.e. 2.1.10$^{-3}$ mol) (1 equivalent per —CHO) are added to 301 mg of P$_3$N$_3$(OC$_6$H$_4$—CHO)$_6$ (0.35 mmol) in solution in 1 ml of THF. The mixture is stirred for 12 hours. The resulting paste is then washed with a THF/Et$_2$O mixture: 1/1 to give a white powder. The final product is isolated in a yield of 78%.

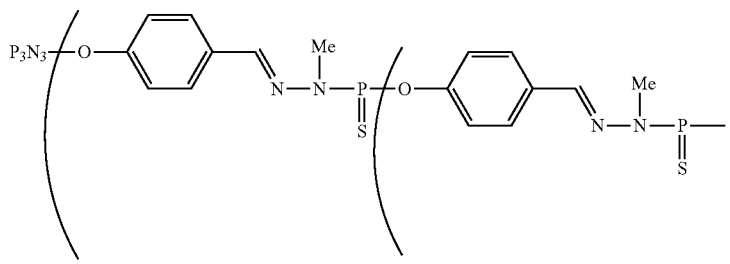

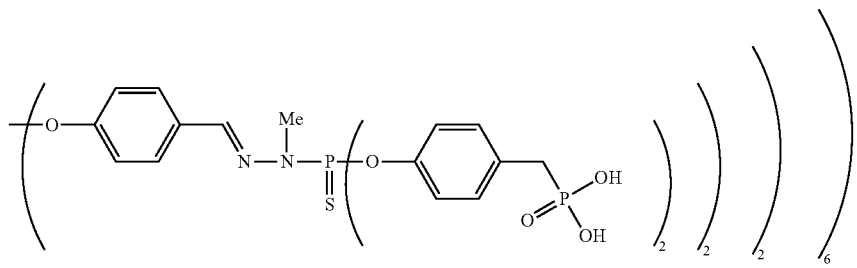

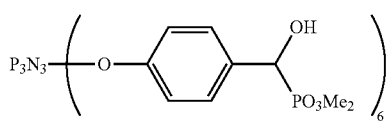

$^{31}$P-{$^1$H} NMR (DMSO d6): δ=11.5 (s, P$_0$), 27.2 (s, P(O)(O—CH$_3$)$_2$) ppm.

Example 19

Synthesis of the Generation Zero Dendritic Polymer Having α-hydroxy-phosphonic Acid Ends The dendritic polymer of generation zero from Example 18 (4.78.10$^{-2}$ mmol, 72 mg) having α-hydroxy dimethylphosphonate ends is suspended in acetonitrile (4 ml) with triethylamine (0.288 mmol, 10.25 μl) at 0° C. Trimethylsilane bromide (0.86 mmol, 115 μl) is then added slowly at 0° C., and the whole returns slowly to ambient temperature over a period of 6 hours. Anhydrous methanol (1 ml) is then added. After 2 hours' stirring, the reaction mixture is dried under reduced pressure. The powder is then suspended in a minimal amount of water for 30 minutes, with vigorous stirring. After filtration, the product is dried and then washed with copious amounts of ether. Preferably, in order to obtain a soluble dendritic polymer, the final dendritic polymer must not be totally desolvated. The final product is isolated in a yield of 60%.

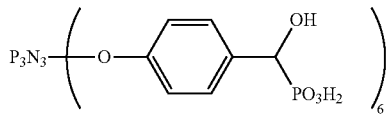

$^{31}$P-{$^1$H} NMR (DMSO d6): δ=11.3 (s, P$_0$), 22.0 (m, P(O)(OH)$_2$) ppm.

IR: Absence of ν(CHO) at 1670 cm$^{-1}$; ν(OH) at 3271 cm$^{-1}$.

Example 20

Synthesis of a Dendritic Polymer of Generation Zero Having Benzyl Dimethyl-Phosphonate Ends

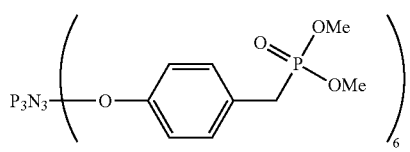

Cesium carbonate (1.3 mmol, 427 mg) and 4-hydroxy-benzyl dimethyl-phosphonate (0.65 mmol, 141 mg) are added to a solution of hexachlorocyclo-triphosphazene (0.109 mmol, 38 mg) in 2 ml of THF. The mixture is stirred for 24 hours at ambient temperature. After filtration, the sample is placed in vacuo until a white powder is obtained, which powder is washed with a pentane/ether mixture (1/1). The final product is isolated in a yield of 61%. $^{31}$P-{$^1$H} NMR (CDCl$_3$): δ=12.2 (s, P$_0$); 31.8 (s, P(O)(OMe)$_2$) ppm.

Example 21

Synthesis of a Dendritic Polymer of Generation Zero Having Benzyl-Phosphonic Ends The dendritic polymer of generation zero having benzyl dimethyl-phosphonate ends from Example 20 (126 mg, 0.1 mmol) is dissolved in acetonitrile (1 ml). The mixture is cooled to 0° C., and then bromotrimethylsilane (198 μl, 1.45 mmol), i.e. 1.2 equivalents of silane per methyl end, is added slowly. The mixture is left at ambient temperature for 16 hours, and then the sample is placed in vacuo for two hours. A powder is obtained, and then anhydrous methanol (1 ml) is added; the suspension is stirred for 2 hours and finally the product is placed in vacuo again for one hour. The resulting powder is washed several times with water and with ether. The final product is isolated in a yield of 79%.

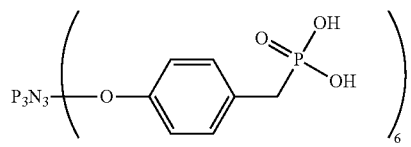

$^{31}$P-{$^1$H} NMR (DMSO d$^6$): δ=11.8 (s, P$_0$); 25.1 (m, P(O)(OH)$_2$) ppm.

Example 22

Synthesis of (4-hydroxy-2-nitrophenylamino)methyl dimethylphosphonate 500 mg of 2-nitro-4-hydroxy-aniline, 1 ml of formaldehyde in 37% solution in water, and 1.2 ml of dimethyl phosphite are mixed at ambient temperature. The resulting red solution is stirred at ambient temperature for 96 hours. The crude residue is purified directly by chromatography on silica gel (eluant: diethyl ether then ethyl acetate). The red residue obtained after column chromatography is diluted in 300 ml of ethyl acetate and then washed with 50 ml of water. The organic phase is then dried over magnesium sulfate and then evaporated to dryness to give the expected product in the form of a red powder in a yield of 71%.

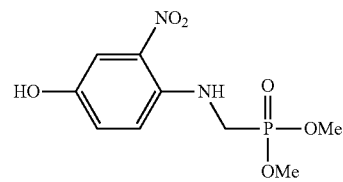

$^{31}$P-{$^1$H} NMR (acetone): δ=28.7 (s, P(O)(OMe)$_2$) ppm.

$^1$H NMR (acetone): δ=3.8 (d, $^3$J$_{HP}$=10.8 Hz, 6H, —OMe); 3.90 (d, $^2$J$_{HP}$=12.6 Hz, 2H, N-CH$_2$—P); 5.9 (s broad, 1H, —NH); 7.0-8.0 (m, 3H, CH$_{arom}$) ppm.

$^{13}$C-{$^1$H} NMR (acetone): δ=38.5 (d, $^1$J$_{CP}$=154.7 Hz, CH$_2$); 52.9 (d, $^2$J$_{CP}$=6.0 Hz, OMe); 110.1 (s, C$_{arom}$); 116.5 (s, C$_{arom}$); 126.8 (s, C$_{arom}$); 132.6 (s, C$_{arom}$); 139.8 (s, C$_{arom}$); 148.3 (s, C$_{arom}$) ppm.

[M+Na]$^+$=299.2 g.mol$^{-1}$.

Example 23

Synthesis of the First Generation Dendritic Polymer Having a Cyclotriphosphazene Core and a 2-Nitrophenylaminomethyl Dimethylphosphonate Surface

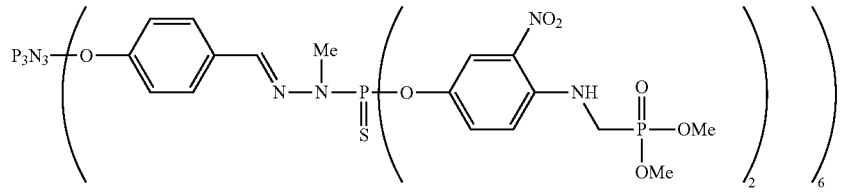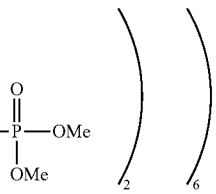

90 mg of phenol (4-hydroxy-2-nitrophenylamino)methyl dimethylphosphonate from Example 22 are added at ambient temperature to a suspension of NaH (7 mg) in THF. After one hour's stirring, 30 mg of dendritic polymer $Gc_1$ in solution in 5 ml of anhydrous THF are added. The mixture is stirred for 24 hours at ambient temperature and is then filtered over Celite, and the final mixture is centrifuged in order to separate off the salts. Finally, the final product is purified by precipitation from pentane and isolated in a yield of 82%.

$^{31}P-\{^1H\}$ NMR (CDCl$_3$): δ=66.1 (s, $P_1$); 28.6 (s, P(O)(OMe)$_2$); 11.9 (s, $P_0$) ppm.

$^1H$ NMR (CDCl$_3$): δ=3.6 (d, $^3J_{HP}$=14.6 Hz, 18H, CH$_3$—N—$P_1$); 3.78 (d, $^3J_{HP}$=10.7 Hz, 72H, —P(O)(O—CH$_3$)$_2$); 3.9 (d, $^2J_{HP}$=12.6 Hz, 24H, —CH$_2$—P(O)(OCH$_3$)$_2$); 7.0-8.1 (m, 66H, CH$_{arom}$, CH=N) ppm.

Example 24

Synthesis of the First Generation Dendritic Polymer Having a Cyclotriphosphazene Core and an Aza-Mono-Phosphonic Surface Derived from Allylamine a) Synthesis of the Dendritic Polymer Having an Allylimine Surface A large excess of allylamine (10 equivalents/CHO) and then MgSO$_4$ (approximately 2 grams) are added to a solution of 230 mg (80 µmol) of Gc'$_1$ in THF or CH$_2$Cl$_2$ (5 ml). The suspension is stirred for 2 days at ambient temperature and is then checked by $^{31}P$ NMR. The mixture is filtered (twice if necessary), and a large volume of pentane is added. The solvent is removed and then the solid is dissolved in a minimal amount of THF and precipitated with pentane. Purification is repeated twice. The resulting solid is dried under reduced pressure. The dendritic polymer having an allylimine termination is obtained in pure form in a yield of 90% in the form of a white solid (240 mg).

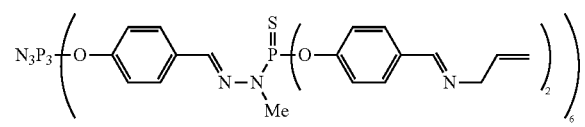

$^{31}P-\{^1H\}$ NMR (CDCl$_3$): δ=12.3 (s); 65.6 (s)

$^1H$ NMR (CDCl$_3$): δ=3.23 (d, $^3J_{HP}$=10.5 Hz, 18H); 4.18 (d, $^3J_{HH}$=5.6 Hz, 24H); 5.21 (m, 24H), 6.01 (m, 12H); 6.98 (d, $^3J_{HH}$=8.5 Hz, 12H); 7.21 (m, 26H); 7.60 (m, 40 H); 8.17 (s, 12H).

b) Synthesis of the Aza-Mono-Phosphonate Dendritic Polymer Derived from Allylamine The dendritic polymer obtained in step (a) is dissolved in a large excess of dimethyl phosphite. The homogeneous solution is stirred for 72 hours at ambient temperature. 10 ml of distilled ether are added to the solution. After decantation, the solvent is removed and the solid is washed with 3×10 ml of ether. The solid is dissolved in a minimal amount of THF and then precipitated by addition of pentane. The residual solid is dried under reduced pressure, and the dendritic polymer having a dimethyl N-(allyl)-methylphosphonate termination is obtained in pure form in a yield of 80% (white powder).

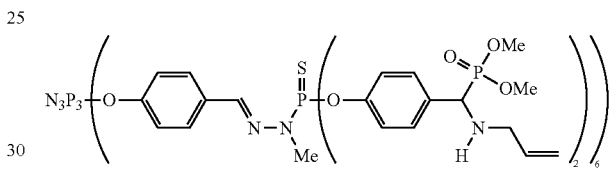

$^{31}P-\{^1H\}$ NMR (CDCl$_3$): δ=11.5 (s); 28.9 (s); 65.5 (s).

$^1H$ NMR (CDCl$_3$): δ=2.00 (sl, NH); 2.99 (m, 12H); 3.21 (m, 12H); 3.30 (d, $^3J_{HP}$=8.11 Hz, 18H); 3.45 (d, $^3J_{HP}$=10.8 Hz, 36H); 3.64 (d, $^3J_{HP}$=10.6 Hz, 36H); 4.02 (d, $^2J_{HP}$=19.7 Hz, 12H); 5.01 (m, 24H); (0.69 (m, 12H); 7.04 (d, $^3J_{HH}$=6.7 Hz, 12H); 7.19 (d, $^3J_{HH}$=6.3 Hz, 24H); 7.31 (d, $^3J_{HH}$=5.5 Hz, 36H); 7.60 (d, $^3J_{HP}$=6.2 Hz, 18H).

c) Synthesis of the Aza-Mono-Phosphonic Dendritic Polymer Derived from Allylamine 46 equivalents of BrTMS (160 µl) are added slowly at 0° C. to a solution of 120 mg (25.8 µmol) of dimethyl N-(allyl)-methylphosphonate dendritic polymer from step b) in acetonitrile (5 ml). The solution is then stirred for 20 hours at ambient temperature. The solvent is evaporated off under reduced pressure and the residue is treated with 10 ml of methanol. After one hour's vigorous stirring in methanol, the solid is dried under reduced pressure and washed with 2×20 ml of distilled ether. The solvent is removed and a 0.1955 M aqueous sodium hydroxide solution (1.6 ml) is added slowly. The homogeneous solution is lyophilised, and the dendritic polymer having a N-(allyl)-methylphosphonic acid (monosodium salt) termination is isolated in quantitative yield in the form of a white powder.

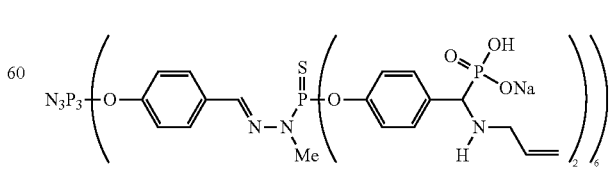

$^{31}P-\{^1H\}$ NMR (CD$_3$CN/D$_2$O): δ=8.9 (s); 10.3 (s); 65.2 (sl)

Example 25

Synthesis of the First Generation Dendritic Polymer Having a Cyclotriphosphazene Core and an Aza-Mono-Phosphonic Surface Derived from Benzylamine a) Synthesis of the Dendritic Polymer Having a Benzylimine Surface A large excess of benzylamine (10-12 equivalents/CHO) and then MgSO$_4$ (approximately 2-3 grams) are added to a solution of 160 mg (56 μmol) of Gc'$_1$ in CH$_2$Cl$_2$ (5 ml). The suspension is stirred for 24 hours at ambient temperature. The mixture is filtered, and a large volume of pentane is added. The solvent is removed and then the solid is dissolved in a minimal amount of THF and precipitated with pentane. The residue is washed with 2×5 ml of distilled ether and the resulting solid is dried under reduced pressure. The dendritic polymer having a benzylimine termination is obtained in pure form in a yield of 90% in the form of a white solid.

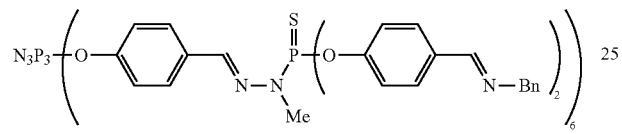

$^{31}$P-{$^1$H} NMR (CDCl$_3$): δ=12.1 (s); 65.6 (s).

b) Aza-Mono-Phosphonate Dendritic Polymer Derived from Benzylamine

The preceding dendritic polymer having imine terminations is dissolved in a large excess of dimethyl phosphite (1 ml). The homogeneous solution is stirred for 72 hours at ambient temperature, and then 10 ml of distilled ether are added to the solution. After decantation, the solvent is removed and the solid is washed with 3×10 ml of ether. The solid is dissolved in a minimal amount of THF and then precipitated by addition of pentane. The resulting solid is dried under reduced pressure, and the dendritic polymer having a dimethyl N-(benzyl)-methylphosphonate termination is obtained in pure form in a yield of 70% (white powder).

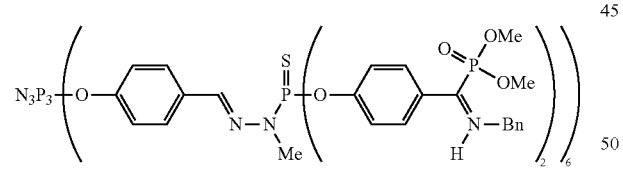

$^{31}$P-{$^1$H} NMR (CDCl$_3$): δ=11.5 (s); 28.7 (s); 65.6 (s)
$^1$H NMR (CDCl$_3$): δ=2.33 (sl, NH); 3.28 (d, $^3$J$_{HP}$=10.2 Hz, 18H); 3.46 (d, $^3$J$_{HP}$=10.6 Hz, 36H); 3.44 (m, 12H); 3.64 (d, $^3$J$_{HP}$=10.5 Hz, 36H); 3.74 (m, 12H); 3.98 (d, $^2$J$_{HP}$=20.0 Hz, 12H); 7.03 (d, $^3$J$_{HH}$=8.5 Hz, 12H); 7.23 (m, 78H); 7.35 (m, 30H); 7.61 (d, $^3$J$_{HH}$=8.4 Hz, 18H).

c) Aza-Mono-Phosphonic Dendritic Polymer Derived from Benzylamine 46 equivalents of BrTMS (190 μl) are added slowly at 0° C. to a solution of 160 mg (30.5 μmol) of dimethyl N-(benzyl)-methylphosphonate dendritic polymer from the preceding step (5 ml). The solution is then stirred for 20 hours at ambient temperature. The solvent is evaporated off under reduced pressure and the residue is treated with 10 ml of methanol. After one hour's vigorous stirring in methanol, the solid is dried under reduced pressure. The phosphonic acid is washed with 2×20 ml of distilled ether. The solvent is removed and the dendritic polymer having pure phosphonic acid ends is treated slowly with a 0.1955 M aqueous sodium hydroxide solution (1.9 ml). The homogeneous solution is lyophilised, and the dendritic polymer having a N-(benzyl)-methylphosphonic acid (monosodium salt) termination is isolated in quantitative yield in the form of a white powder.

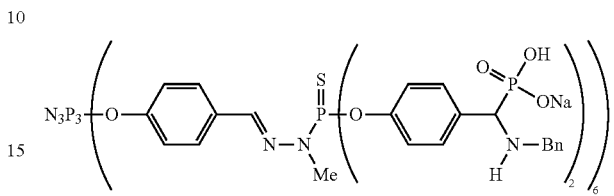

$^{31}$P-{$^1$H} NMR (CD$_3$CN/D$_2$O): δ=8.8 (s); 10.3 (s); 65.1 (sl).

Example 26

Synthesis of the First Generation Dendritic Polymer Having a Cyclotriphosphazene Core and an Aza-Mono-Phosphonic Surface Derived from Methylamine a) Dendritic Polymer Having a Methylimine Surface A large excess (10-12 equivalents/CHO) of methylamine (in 8M solution in ethanol) and then MgSO$_4$ (approximately 2 to 3 grams) are added to a solution of 200 mg (70 μmol) of Gc'$_1$ in THF (5 ml). The suspension is stirred for 20 hours at ambient temperature. The mixture is filtered, and a large volume of pentane is added. The solvent is removed and then the solid is dissolved in a minimal amount of THF and precipitated with pentane. The residue is washed twice with 5 ml of distilled ether and the resulting solid is dried under reduced pressure. The dendritic polymer having a methylimine termination is obtained in pure form in a yield of 85% in the form of a white solid.

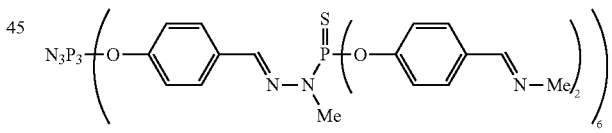

$^{31}$P-{$^1$H} NMR (CDCl$_3$): δ=12.1 (s); 65.5 (s)
$^1$H NMR (CDCl$_3$): δ=3.23 (d, $^3$J$_{HP}$=10.4 Hz, 18H); 3.44 (s, 36H); 6.98 (d, $^3$J$_{HH}$=8.5 Hz, 12H); 7.20 (d, $^3$J$_{HH}$=7.2 Hz, 24H); 7.58 (m, 42H); 8.15 and 8.16 (2s, 12H).

b) Aza-Mono-Phosphonate Dendritic Polymer Derived from Methylamine

The dendritic polymer having imine terminations from the preceding step is dissolved in a large excess of dimethyl phosphite. The homogeneous solution is stirred for 72 hours at ambient temperature, and then 10 ml of distilled ether are added. After decantation, the solvent is removed and the solid is washed with 3×10 ml of ether. The residue is dissolved in a minimal amount of THF and then precipitated by addition of pentane. The resulting solid is dried under reduced pressure, and the dendritic polymer having a dimethyl N-(methyl)-methylphosphonate termination is obtained in pure form in a yield of 80% (white powder).

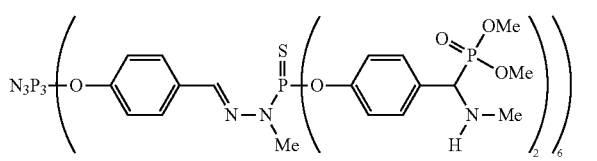

$^{31}$P-{$^1$H} NMR (CDCl$_3$): δ=11.5 (s); 29.0 (s); 65.2 (s).

c) Aza-Mono-Phosphonic Dendritic Polymer Derived from Methylamine 46 equivalents of BrTMS (230 μl) are added slowly at 0° C. to a solution of 160 mg (37 μmol) of dimethyl N-(methyl)-methylphosphonate dendritic polymer from the preceding step (5 ml). The solution is then stirred for 20 hours at ambient temperature. The solvent is evaporated off under reduced pressure and the residue is treated with 10 ml of methanol. After one hour's vigorous stirring in methanol, the solid is dried under reduced pressure. The phosphonic acid is washed with 2×20 ml of distilled ether. The solvent is removed and the dendritic polymer having pure phosphonic acid ends is treated slowly with a 0.1955 M aqueous sodium hydroxide solution (2.3 ml). The homogeneous solution is lyophilised, and the dendritic polymer having a N-(methyl)-methylphosphonic acid (monosodium salt) termination is isolated in a quantitative yield in the form of a white powder.

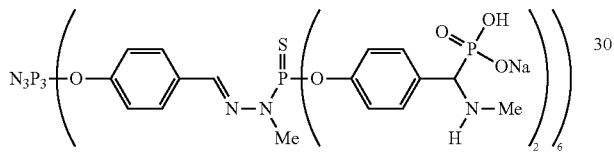

$^{31}$P-{$^1$H} NMR (CD$_3$CN/D$_2$O): δ=8.9 (s); 10.5 (s); 65.1 (sI).

Example 27

Lubricating Properties

The compounds according to the invention were tested in a Falex lubrication test (rupture test) with steel/steel contact. This test demonstrated that the functionalised biphosphonate dendritic polymers of the invention can be used as an extreme pressure lubrication additive. Such additives, diluted at 1%, allow a level of lubrication to be obtained that is equal or superior to that of an alkyl phosphate ester, which is often used as a lubrication additive.

The invention claimed is:

1. A dendritic polymer of generation n composed of:
   a central core § of valence m;
   generation chains branching around the core;
   an intermediate chain at the end of each bond around the core or at the end of each generation chain, where appropriate; and
   a terminal group at the end of each intermediate chain,
wherein m represents an integer from 3 to 8; n represents an integer from 0 to 12,
wherein the generation chains are represented by the formula:

-A"-N<  (C1")

wherein
   A" represents an alkyl radical, an alkenyl radical or a alkynyl radical, each of which is optionally substituted by one or more substituents selected from -Alkyl, -Hal, —NO$_2$ —NRR', —CN, —CF$_3$, —OH, -OAlkyl, -Aryl, and -Aralkyl; and wherein R and R', which are identical or different, each independently of the other represents a hydrogen atom or an -alkyl radical, an -aryl radical, or an -aralkyl radical, the intermediate chains, which are identical or different, are represented by formula

-J-K-L-  (C2)

or

-L"-  (C2')

wherein
   J represents an oxygen atom, a sulfur atom or a radical —NR—;
   K represents an aryl, heteroaryl or alkyl radical, each of which is optionally substituted by a halogen atom or by —NO$_2$, —NRR', —CN, —CF$_3$, —OH, an -alkyl radical, an -aryl radical, or an -aralkyl radical;
   L represents a hydrocarbon chain having from 1 to 6 chain members and optionally having one or more heteroatoms and/or optionally having one or more double or triple bonds, each of said chain members being optionally substituted by one or more substituents selected from —OH, —NRR', and -Oalkyl; and R and R', which are identical or different, each independently of the other represents a hydrogen atom or an -alkyl, -aryl, or -aralkyl radical; and
   L" represents an -alkyl- chain having from 1 to 6 chain members, optionally substituted by one or more substituents selected from —OH, —NRR', and -Oalkyl, where R and R', which may be identical or different, each independently represent a hydrogen atom, an alkyl radical, an aryl radical or an -aralkyl radical;
and the terminal group consists of the group of formula:

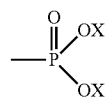

wherein each of the radicals X is a methyl group,
   with the exception of the compound of formula:

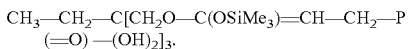

2. A dendritic polymer according to claim 1, wherein the central core contains at least one phosphorus atom.

3. A dendritic polymer according to claim 1, wherein the central core is selected from the following groups:

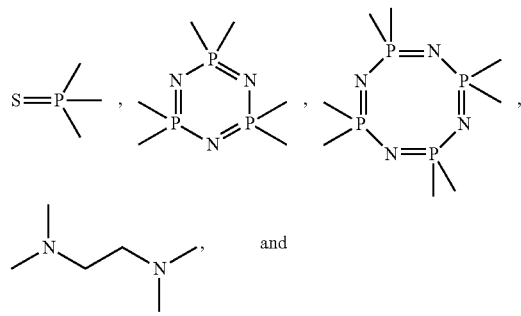

-continued

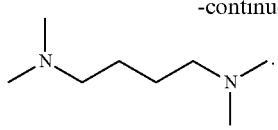

4. A dendritic polymer according to claim 1, wherein the central core has the formula:

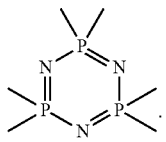

5. A dendritic polymer according to claim 1, having a DAB-AM, PAMAM, or PMMH structure.

6. A dendritic polymer according to claim 1, wherein the generation chains are identical.

7. A dendritic polymer according to claim 1, wherein J represents an oxygen atom.

8. A dendritic polymer according to claim 1, wherein K represents a phenyl ring optionally substituted by a halogen atom or by an —NO$_2$, —NRR', —CN, —CF$_3$, —OH, an -alkyl radical, an -aryl radical, or an -aralkyl radical; where R and R', which may be identical or different, each independently represent a hydrogen atom, an alkyl radical, an aryl radical or an aralkyl radical.

9. A dendritic polymer according to claim 1, wherein K represents an unsubstituted phenyl ring.

10. A dendritic polymer of generation n comprising:
(a) a central core having the formula:

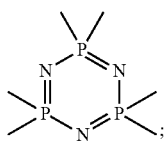

(b) generation chains branching around the core;
(c) an intermediate chain at the end of each bond around the core or at the end of each generation chain, where appropriate; and
(d) a terminal group at the end of each intermediate chain, n represents an integer from 0 to 12, the generation chains are represented by the formula:

-A'-(C=O)—N(R)—B'—N<    (C1')

wherein
A' and B', each independently of the other, represent an alkyl radical, an alkenyl radical or an alkynyl radical, each of which is optionally substituted by one or more substituents selected from -alkyl, halogen atoms, —NO$_2$, —NRR', —CN, —CF$_3$, —OH, —OAlkyl, -aryl, and -aralkyl; and
R and R', which may be identical or different, each independently represent a hydrogen atom, an alkyl radical, an aryl radical or an araalkyl radical the intermediate chains, which are identical or different, are represented by formula

-J-K-L-    (C2)

or

-L"-    (C2')

wherein
J represents an oxygen atom, a sulfur atom or a radical —NR—;
K represents an aryl, heteroaryl or alkyl radical, each of which is optionally substituted by a halogen atom or by —NO$_2$, —NRR', —CN, —CF$_3$, —OH, an -alkyl radical, an -aryl radical, or an -aralkyl radical;
L represents a hydrocarbon chain having from 1 to 6 chain members and optionally having one or more heteroatoms and/or optionally having one or more double or triple bonds, each of said chain members being optionally substituted by one or more substituents selected from —OH, —NRR', and -Oalkyl; and R and R', which are identical or different, each independently of the other represents a hydrogen atom or an -alkyl, -aryl, or -aralkyl radical; and
L" represents an -alkyl- chain having from 1 to 6 chain members, optionally substituted by one or more substituents selected from —OH, —NRR', and -Oalkyl, where R and R', which may be identical or different, each independently represent a hydrogen atom, an alkyl radical, an aryl radical or an -aralkyl radical;
and further wherein the terminal group consists of the group of formula:

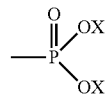

wherein each of the radicals X, which are identical or different, represents a radical -Me, —H and/or -M$^+$, wherein M$^+$ is a cation.

11. A dendritic polymer according to claim 10, wherein M is selected from sodium and potassium atoms.

12. A dendritic polymer according to claim 10, wherein n is from 0 to 3.

13. A dendritic polymer according to claim 10, having a DAB-AM, PAMAM, or PMMH structure.

14. A dendritic polymer according to claim 10, wherein the generation chains are identical.

15. A dendritic polymer according to claim 10, wherein J represents an oxygen atom.

16. A dendritic polymer according to claim 10, wherein K represents a phenyl ring optionally substituted by a halogen atom or by an —NO$_2$, —NRR', —CN, —CF$_3$, —OH, an -alkyl radical, an -aryl radical, or an -aralkyl radical; where R and R', which may be identical or different, each independently represent a hydrogen atom, an alkyl radical, an aryl radical or an aralkyl radical.

17. A dendritic polymer according to claim 10, wherein K represents an unsubstituted phenyl ring.

18. A dendritic polymer of generation n comprising:
(a) a central core having the formula:

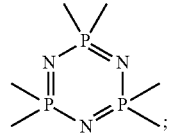

(b) optionally, generation chains branching around the core;

(c) an intermediate chain at the end of each bond around the core or at the end of each generation chain, where appropriate; and
(d) a terminal group at the end of each intermediate chain, n represents an integer from 0 to 12, the intermediate chains, which are identical or different, are represented by formula

or

wherein
J represents an oxygen atom, a sulfur atom or a radical —NR—;
K represents an aryl, heteroaryl or alkyl radical, each of which is optionally substituted by a halogen atom or by —NO$_2$, —NRR', —CN, —CF$_3$, —OH, an -alkyl radical, an -aryl radical, or an -aralkyl radical;
L represents an -alkyl-, -alkenyl- or -alkynyl- radical, each of which is optionally substituted by one or more substituents selected from —OH, —NRR', and —Oalkyl; and
L" represents an -alkyl- chain having from 1 to 6 chain members, optionally substituted by one or more substituents selected from —OH, —NRR', and -Oalkyl, where R and R', which may be identical or different, each independently represent a hydrogen atom, an alkyl radical, an aryl radical or an -aralkyl radical;

and further wherein the terminal group consists of the group of formula:

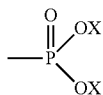

wherein each of the radicals X, which are identical or different, represents a radical -Me, —H and/or -M$^+$, wherein M$^+$ represents a cation.

19. A dendritic polymer according to claim 18, wherein L represents an alkenyl radical or an alkyl radical, optionally substituted by a radical —OH.

20. A dendritic polymer according to claim 19, wherein represents an alkyl radical optionally substituted by —OH.

21. A dendritic polymer according to claim 18, having a DAB-AM, PAMAM, or PMMH structure.

22. A dendritic polymer according to claim 18, wherein M is selected from sodium and potassium atoms.

23. A dendritic polymer according to claim 18, wherein n is from 0 to 3.

24. A dendritic polymer according to claim 18, wherein the generation chains are selected from linear and branched hydrocarbon chains having from 1 to 12 chain members and optionally having one or more double or triple bonds, each of said chain members optionally being selected from a heteroatom, an Aryl radical, a Heteroaryl radical, >C=O, and >C=NR, each chain member being optionally substituted by one or more substituents selected from -Alkyl, -Hal, —NO$_2$, —NRR', —CN, —CF$_3$, —OH, —OAlkyl, -Aryl, and -Aralkyl,
wherein
R and R', which are identical or different, each independently of the other represents a hydrogen atom, an alkyl radical, an aryl radical or an -aralkyl radical.

25. A dendritic polymer according to claim 18, wherein the generation chains are represented by the formula:

wherein
A" represents an alkyl radical, an alkenyl radical or a alkynyl radical, each of which is optionally substituted by one or more substituents selected from -Alkyl, -Hal, —NO$_2$, —NRR', —CN, —CF$_3$, —OH, —OAlkyl, -Aryl, and -Aralkyl; and wherein R and R', which are identical or different, each independently of the other represents a hydrogen atom or an -alkyl radical, an -aryl radical, or an -aralkyl radical.

26. A dendritic polymer according to claim 18, wherein the generation chains are identical.

27. A dendritic polymer according to claim 18, wherein J represents an oxygen atom.

28. A dendritic polymer according to claim 18, wherein K represents a phenyl ring optionally substituted by a halogen atom or by an —NO$_2$, —NRR', —CN, —CF$_3$, —OH, an -alkyl radical, an -aryl radical, or an -aralkyl radical; where R and R', which may be identical or different, each independently represent a hydrogen atom, an alkyl radical, an aryl radical or an aralkyl radical.

29. A dendritic polymer according to claim 18, wherein K represents an unsubstituted phenyl ring.

30. A dendritic polymer represented by the formula (I-2):

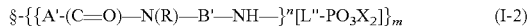

in which:
§ represent a central core of valence m,
-{A'-(C=O)—N(R)—B'—NH—}$^n$ represents generation chains branching around the core,
L" represents intermediate chains, and
—PO$_3$X$_2$ represents a terminal group at the end of each intermediate chain,
wherein
A' and B', each independently of the other, represent an alkyl radical, an alkenyl radical or an alkynyl radical, wherein said radicals may have one or more substituents selected from the group consisting of -alkyl radicals, halogen atoms, —NO$_2$, —NRR', —CN, —CF$_3$, —OH, -Oalkyl radicals, -aryl radicals, and -aralkyl radicals;
L" represents an -alkyl- chain having from 1 to 6 chain members, optionally substituted by one or more substituents selected from —OH, —NRR', and -Oalkyl;
N represents a nitrogen atom;
P represents a phosphorus atom;
R and R', which may be identical or different, each independently represent a hydrogen atom, an alkyl radical, an aryl radical or an aralkyl radical.
X=methyl,
m represents an integer from 3 to 8, and
n represents an integer from 0 to 12.

31. A dendritic polymer represented by the formula (I-3):

in which:
§ represent a central core of valence m,
{A"—NH—} represents generation chains branching around the core,
L" represents intermediate chains, and
—PO$_3$X$_2$ represents a terminal group at the end of each intermediate chain,
wherein
A" represents an alkyl radical, an alkenyl radical or an alkynyl radical, optionally substituted with one or more substituents selected from the group consisting of -alkyl, halogen atoms, —NO$_2$, —NRR', —CN, —CF$_3$, —OH, —OAlkyl, -Aryl, and -Aralkyl;

L" represents an -alkyl- chain having from 1 to 6 chain members, optionally substituted by one or more substituents selected from —OH, —NRR', and -Oalkyl;

N represents a nitrogen atom;

P represents a phosphorus atom;

R and R', which may be identical or different, each independently represent a hydrogen atom, an -alkyl radical, an -aryl radical, or an -aralkyl radical;

X=methyl, m represents an integer from 3 to 8, and n represents an integer from 0 to 12.

32. A dendritic polymer comprising:
(a) a central core § of valence m;
(b) generation chains branching around the core;
(c) an intermediate chain at the end of each bond around the core or at the end of each generation chain, where appropriate; and
(d) a terminal group at the end of each intermediate chain, wherein m represents an integer from 3 to 8; n represents an integer from 0 to 12, wherein the generation chains, which are identical or different, are represented by the formula:

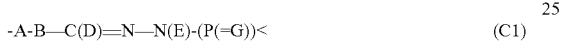  (C1)

wherein:

A represents an oxygen, sulfur or phosphorus atom or a radical —NR—;

B represents a radical -Aryl-, -Heteroaryl-, or -Alkyl-, each of which is optionally substituted by a Halogen atom or by a radical —NO$_2$, —NRR', —CN, —CF$_3$, —OH, -Alkyl, -Aryl, or -Aralkyl;

C represents a carbon atom,

D and E, which are identical or different, each independently of the other represents a hydrogen atom, a radical -Alkyl, —OAlkyl, -Aryl, or -Aralkyl, each of which is optionally substituted by a Halogen atom or by a radical —NO$_2$, —NRR', —CN, —CF$_3$, —OH, -Alkyl, -Aryl, or -Aralkyl;

G represents a sulfur, oxygen, selenium or tellurium atom or a radical =NR;

R and R', which are identical or different, each independently of the other represents a hydrogen atom or a radical -Alkyl, -Aryl, or -Aralkyl; and < represents the two bonds at the end of each generation chain, the intermediate chains, which are identical or different, are represented by formula

J-K-L-  (C2)

or

-L"-  (C2')

wherein

J represents an oxygen atom, a sulfur atom or a radical —NR—;

K represents an aryl, heteroaryl or alkyl radical, each of which is optionally substituted b a halogen atom or b —NO$_2$—NRR', —CN, —CF$_3$—OH an -alkyl radical an -aryl radical, or an -aralkyl radical;

L represents an -alkyl-, -alkenyl- or -alkynyl- radical, each of which is optionally substituted by one or more substituents selected from —OH, —NRR', and —Oalkyl; and L" represents an -alkyl- chain having from 1 to 6 chain members, optionally substituted by one or more substituents selected from —OH, —NRR', and -Oalkyl, where R and R', which may be identical or different, each independently represent a hydrogen atom, an alkyl radical, an aryl radical or an -aralkyl radical;

and further wherein the terminal group consists of the group of formula:

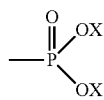

wherein each of the radicals X, which are identical or different, represents a radical -Me, —H and/or -M$^+$, wherein M$^+$ represents a cation.

33. A dendritic polymer according to claim 32, wherein the central core contains at least one phosphorus atom.

34. A dendritic polymer according to claim 32, wherein the central core is selected from the following groups:

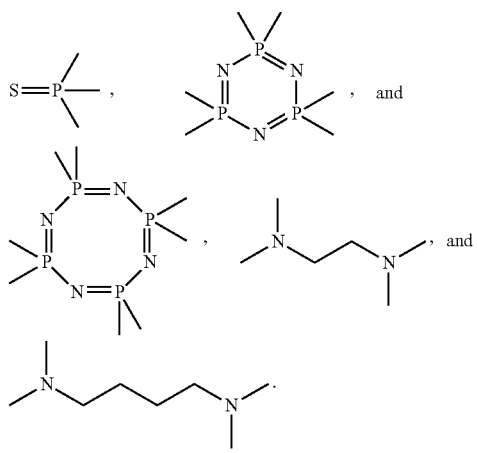

35. A dendritic polymer according to claim 32, wherein the central core has the formula:

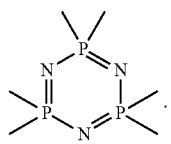

36. A dendritic polymer of generation n comprising:
(a) a central core § of valence m;
(b) generation chains branching around the core;
(c) an intermediate chain at the end of each bond around the core or at the end of each generation chain, where appropriate; and
(d) a terminal group at the end of each intermediate chain, wherein m represents an integer from 3 to 8; n represents an integer from 0 to 12, the generation chains are represented by the formula:

  (C1')

wherein
A' and B', each independently of the other, represent an alkyl radical, an alkenyl radical or an alkynyl radical, each of which is optionally substituted by one or more substituents selected from -alkyl, halogen atoms —NO₂—NRR', —CN, —CF₃, —OH, —OAlkyl, -aryl, and -aralkyl; and
R and R', which may be identical or different, each independently represent a hydrogen atom, an alkyl radical, an aryl radical or an aralkyl radical the intermediate chains, which are identical or different, are represented by formula

-J-K-L- (C2)

or

-L"- (C2')

wherein
J represents an oxygen atom, a sulfur atom or a radical —NR—;
K represents an aryl, heteroaryl or alkyl radical, each of which is optionally substituted b a halogen atom or b —NO₂—NRR', —CN, —CF₃—OH an -alkyl radical an -aryl radical, or an -aralkyl radical;
L represents a hydrocarbon chain having from 1 to 6 chain members and optionally having one or more heteroatoms and/or optionally having one or more double or triple bonds, each of said chain members being optionally substituted by one or more substituents selected from —OH, —NRR', and -Oalkyl; and R and R', which are identical or different, each independently of the other represents a hydrogen atom or an -alkyl, -aryl, or -aralkyl radical; and
L" represents an -alkyl- chain having from 1 to 6 chain members, optionally substituted by one or more substituents selected from —OH, —NRR', and -Oalkyl, where R and R', which may be identical or different, each independently represent a hydrogen atom, an alkyl radical, an aryl radical or an -aralkyl radical; and further wherein the terminal group consists of the group of formula:

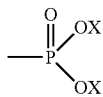

where X=methyl.

37. A dendritic polymer according to claim 36, wherein the central core contains at least one phosphorus atom.

38. A dendritic polymer according to claim 36, wherein the central core is selected from the following groups:

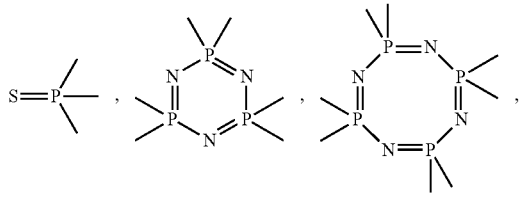

-continued

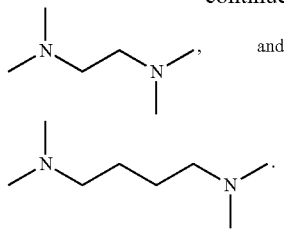

39. A dendritic polymer according to claim 36, wherein the central core has the formula:

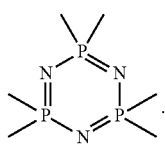

40. A dendritic polymer comprising:
(a) a central core § of valence m;
(b) optionally, generation chains branching around the core;
(c) an intermediate chain at the end of each bond around the core or at the end of each generation chain, where appropriate; and
(d) a terminal group at the end of each intermediate chain,
wherein m represents an integer from 3 to 8; n represents an integer from 0 to 12, the intermediate chains, which are identical or different, are represented by formula

-J-K-L- (C2)

or

-L"- (C2')

wherein
J represents an oxygen atom, a sulfur atom or a radical —NR—;
K represents an aryl, heteroaryl or alkyl radical, each of which is optionally substituted b a halogen atom or b —NO₂—NRR', —CN, —CF₃—OH an -alkyl radical an -aryl radical, or an -aralkyl radical;
L represents an -alkyl-, -alkenyl- or -alkenyl- radical, each of which is optionally substituted by one or more substituents selected from —OH, —NRR', and -Oalkyl; and
L" represents an -alkyl- chain having from 1 to 6 chain members, optionally substituted by one or more substituents selected from —OH, —NRR', and -Oalkyl, where R and R', which may be identical or different, each independently represent a hydrogen atom, an alkyl radical, an aryl radical or an -aralkyl radical;
and further wherein the terminal group consists of the group of formula:

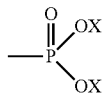

wherein X=methyl.

41. A method for preparing a dendritic polymer according to claim 1, comprising:

(i) reacting the corresponding dendritic polymer having a terminal function —CHO, —CH=NR or (P(=S)Cl$_2$ with a compound of formula Z—PO$_3$Me$_2$, wherein Z represents either —H, when the terminal function is —CHO or —CH=NR, or the intermediate chain defined above when the terminal function is —(P(=S)Cl$_2$;

(ii) optionally followed, when X represents H or M, by a step which comprises converting the dendritic polymer obtained in step (i) having a —PO$_3$Me$_2$ terminal group into the corresponding dendritic polymer having a —PO$_3$H$_2$ terminal group;

(iii) optionally followed, when X represents M, by a step which comprises converting the dendritic polymer obtained in (ii) having a —PO$_3$H$_2$ terminal group into the salt of the corresponding dendritic polymer having a —PO$_3$M$_2$ terminal group.

42. A method for preparing a dendritic polymer according to claim 8, wherein said method comprises reacting a compound of formula (V)

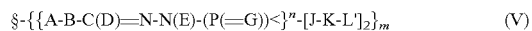

with H-PO$_3$Me$_2$ to obtain a compound of formula (III-1)

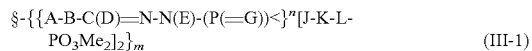

wherein §, A, B, C, D, E, G, N, P, J, K, L, L', m, n, and < have the meanings defined in claim 1, and wherein said reaction is carried out in the presence of an organic or inorganic base, at a temperature of from −80° C. to 100° C.

43. A method according to claim 42, wherein the base is triethylamine.

44. A method for preparing a dendritic polymer according to claim 30 of formula (I-2)

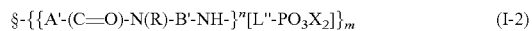

in which §, A', B', C, A'', N, P, X, L'', m, and n have the meanings defined in claim 30, comprising step (i), which comprises reacting the corresponding dendritic polymer n of formula

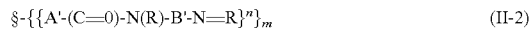

or 

wherein R is a radical >Alkyl, with a compound of the formula H-PO$_3$Me$_2$ (VI), (ii) optionally followed, when X represents H or M, by a step which comprises converting the dendritic polymer of formula (III-2) or (III-3) obtained in (i) in which X represents a methyl radical into the corresponding dendritic polymer of formula (I-2) or (I-3) in which X represents a hydrogen atom, according to the following reaction scheme:

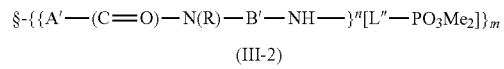

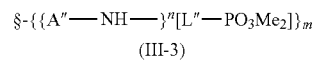

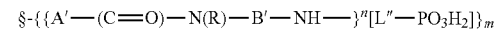

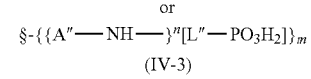

(iii) optionally followed, when X represents M, by a step which comprises converting the dendritic polymer of formula (IV-2) or (IV-3) obtained in (ii) into the corresponding salt.

45. A method according to claim 44, wherein step (i) is carried out in the presence of an organic or inorganic base, at a temperature of from −80° C. to 100° C.

46. A method according to claim 44, wherein reaction (ii) is carried out:

by the action of a trimethylsilane halide, in a polar aprotic organic solvent, followed by the action of anhydrous MeOH, which is added to the reaction mixture.

47. A method according to claim 44, wherein the trimethylsilane halide is Me$_3$SiBr.

48. A method according to claim 44, wherein step (iii) comprises a reaction in which the compounds of formula (IV) are made to act in the presence of a base.

49. A method according to claim 48, wherein the base is selected from sodium hydroxide and potassium hydroxide.

50. A method for preparing a dendritic polymer according to claim 31 of formula (I-3)

in which §, A', B', C, A'', N, P, X, L'', m, and n have the meanings defined in claim 31, comprising step (i), which comprises reacting the corresponding dendritic polymer n of formula

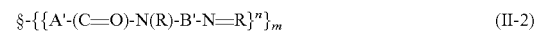

or 

wherein R is a radical>Alkyl, with a compound of the formula H-PO$_3$Me$_2$ (VI), (ii) optionally followed, when X represents H or M, by a step which comprises converting the dendritic polymer of formula (III-2) or (III-3) obtained in (i) in which X represents a Methyl radical into the corresponding dendritic polymer of formula (I-2) or (I-3) in which X represents a hydrogen atom, according to the following reaction scheme:

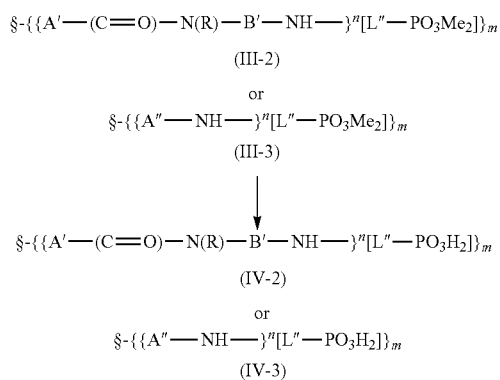

(iii) optionally followed, when X represents M, by a step which comprises converting the dendritic polymer of formula (IV-2) or (IV-3) obtained in (ii) into the corresponding salt.

51. A method according to claim 50, wherein step (i) is carried out in the presence of an organic or inorganic base, at a temperature of from −80° C. to 100° C.

52. A method according to claim 50, wherein reaction (ii) is carried out:

by the action of a trimethylsilane halide, in a polar aprotic organic solvent, followed by the action of anhydrous MeOH, which is added to the reaction mixture.

53. A method according to claim 52, wherein the trimethylsilane halide is $Me_3SiBr$.

54. A method according to claim 50, wherein step (iii) comprises a reaction in which the compounds of formula (IV) are made to act in the presence of a base.

55. A method according to claim 54, wherein the base is selected from sodium hydroxide and potassium hydroxide.

56. A method for treating surfaces, said method comprising contacting said surfaces with a composition comprising a dendritic polymer according to claim 1.

57. A method according to claim 56, wherein said surfaces are metal, silicon-based or oxides.

* * * * *